US008818707B2

(12) United States Patent
Baselau et al.

(10) Patent No.: US 8,818,707 B2
(45) Date of Patent: Aug. 26, 2014

(54) METHOD OF RESOLVING A LOCATION FROM ENCODED DATA REPRESENTATIVE THEREOF

(75) Inventors: Sven Baselau, Berlin (DE); Lars Petzold, Berlin (DE); Ralf-Peter Schaefer, Berlin (DE)

(73) Assignee: TomTom International B.V., Amsterdam (NL)

( * ) Notice: Subject to any disclaimer, the term of this patent is extended or adjusted under 35 U.S.C. 154(b) by 310 days.

(21) Appl. No.: 12/736,714

(22) PCT Filed: Jun. 29, 2009

(86) PCT No.: PCT/EP2009/058130
§ 371 (c)(1),
(2), (4) Date: Dec. 28, 2010

(87) PCT Pub. No.: WO2010/000706
PCT Pub. Date: Jan. 7, 2010

(65) Prior Publication Data
US 2011/0098912 A1    Apr. 28, 2011

Related U.S. Application Data

(60) Provisional application No. 61/193,027, filed on Oct. 22, 2008, provisional application No. 61/129,491, filed on Jun. 30, 2008.

(51) Int. Cl.
*G01C 21/00* (2006.01)

(52) U.S. Cl.
USPC .......................................... 701/410; 701/400

(58) Field of Classification Search
USPC .......................................... 701/400, 408–414
See application file for complete search history.

(56) References Cited

U.S. PATENT DOCUMENTS 6,092,022 A    7/2000   McBride
6,405,128 B1   6/2002   Bechtolsheim et al.
(Continued)

FOREIGN PATENT DOCUMENTS

EP    1273883 B1    8/2004
EP    2161541 A1    3/2010
(Continued)

OTHER PUBLICATIONS

International Preliminary Report on Patentability dated Jan. 5, 2011.
(Continued)

*Primary Examiner* — Hussein A. Elchanti

(57) ABSTRACT

A method, of resolving a location from an ordered list of location reference points being representative of nodes in an encoder digital map and each having attributes representative of a specific line or segment in the encoder digital map emanating from or incident at those nodes, is disclosed. In at least one embodiment, the method includes (i) for each location reference point, identifying at least one candidate node existing in a second digital map, and, using the available attributes of that location reference point, identifying at least one candidate line or segment existing in the second digital map emanating from or incident at the candidate node, (ii) performing a route search within the second digital map between: (a) at least one of said at least one candidate node and the corresponding candidate line or segment emanating therefrom or incident thereat, and (b) at least one of a candidate node for the next location reference point appearing in the list and the corresponding candidate line or segment emanating therefrom or incident thereat, and extracting from the second digital map each line or segment forming part of the route so determined between the candidate nodes, (iii) repeating step (ii) for each consecutive pair of location reference points up to and including the final location reference point appearing in the list. Preferably, the route search is a shortest path route search, most preferably operating on respective pairs of successive candidate nodes, and includes a way of ensuring that the corresponding line or segment of the first of the pair of nodes forms part of the route resulting therefrom.

23 Claims, 14 Drawing Sheets

(56) References Cited

U.S. PATENT DOCUMENTS

| | | |
|---|---|---|
| 6,415,226 B1 * | 7/2002 | Kozak .................... 701/411 |
| 6,687,611 B1 | 2/2004 | Hessing et al. |
| 6,850,842 B2 | 2/2005 | Park |
| 7,349,799 B2 | 3/2008 | Joe et al. |
| 7,353,108 B2 | 4/2008 | Adachi |
| 8,185,306 B2 | 5/2012 | Adachi |
| 8,351,704 B2 | 1/2013 | Kmiecik et al. |
| 2003/0004636 A1 | 1/2003 | Adachi |
| 2003/0083813 A1 | 5/2003 | Park |
| 2004/0039524 A1 | 2/2004 | Adachi |
| 2005/0187708 A1 | 8/2005 | Joe et al. |
| 2006/0247852 A1 * | 11/2006 | Kortge et al. ............ 701/209 |
| 2008/0198043 A1 | 8/2008 | Adachi |
| 2008/0201072 A1 | 8/2008 | Adachi |
| 2008/0208469 A1 * | 8/2008 | Obradovich et al. ..... 701/213 |

FOREIGN PATENT DOCUMENTS

| | | |
|---|---|---|
| JP | 11-258981 | 9/1999 |
| JP | 2001021377 A | 1/2001 |
| JP | 2002228468 A | 8/2002 |
| JP | 2003016570 A | 1/2003 |
| JP | 2003288007 A | 10/2003 |
| JP | 2005345527 A | 12/2005 |
| RU | 2272255 C | 3/2006 |

OTHER PUBLICATIONS

International Search Report issued Jul. 13, 2011 for International Application No. PCT/US2011/031488.

* cited by examiner

Connection of LRPs

Logical format: Bearing point

Logical format: Bearing

Logical format: Distance to next point

Logical format: Positive and negative offset

Relationship: Attributes - LRP

Avoid nodes (1)

Avoid nodes (2)

Physical format: Bearing sectors

METHOD OF RESOLVING A LOCATION FROM ENCODED DATA REPRESENTATIVE THEREOF

This is a National Phase of PCT Patent Application No. PCT/EP2009/058130, filed on Jun. 29, 2009, which claims priority under 35 U.S.C. §365(c) and 119(e) to U.S. Provisional Application No. 61/129,491, filed on Jun. 30, 2008 and U.S. Provisional Application No. 61/193,027, filed on Oct. 22, 2008, the contents of each of which are hereby incorporated herein by reference in their entirety.

FIELD OF THE INVENTION

The present invention is concerned with a method of resolving a location represented by data encoded according to one or more predetermined formats, and more specifically is concerned with a method for accurately determining a location within a digital map, such as those created and sold by Tele Atlas B.V. and Navteq Inc., in a manner which is not dependent on the particular digital map used during a decoding process and yet is identical to the originally encoded location. In this regard, the method can be considered as map-agnostic, but the manner in which the decoding occurs, as opposed to the resolving of decoded data into a location, will inevitably be dependent on the predetermined format chosen.

Although the term "location" in the context of digital mapping can mean any of a variety of different physical, real-world features (e.g. a point location on the surface of the earth, a continuous path or route, or a contiguous chain of such, of navigable thoroughfares existing on earth, or an area or region on earth capable, in the case of a rectangular, square or circular area, of being defined by two or more parameters), this invention is most applicable to an encoded data representation of a path through a network of roads or other navigable thoroughfares represented in a digital map.

BACKGROUND TO THE INVENTION

In applicant's complementary application filed on even date herewith entitled "An Efficient Location Referencing Method", a technique is described for producing a machine-readable representation of a location in a manner which not only is considered optimised as far as overall byte length is concerned, but which is also considered as being map-agnostic.

Any modern digital map (or mathematical graph, as they are sometimes known) of a road network, in its simplest form, is effectively a database consisting of a plurality of tables defining firstly nodes (which can be considered as points or zero-dimensional objects) most commonly representative of road intersections, and secondly lines between those nodes representing the roads between those intersections. In more detailed digital maps, lines may be divided into segments defined by a start node and end node, which may be the same in the case of a segment of zero length, but are more commonly separate. Nodes may be considered real or "valid" for the purposes of this application when they represent a road intersection at which a minimum of 3 lines or segments intersect, whereas "artificial" or "avoidable" nodes are those which are provided as anchors for segments not being defined at one or both ends by a real node. These artificial nodes are useful in digital maps to provide, among other things, shape information for a particular stretch of road or a means of identifying the position along a road at which some characteristic of that road changes, e.g. a speed limit.

In practically all modern digital maps, nodes and segments (and/or lines) are further defined by various attributes which are again represented by data in the tables of the database, e.g. each node will typically have latitude and longitude attributes to define its real-world position. The complete "graph" of the road network is described by millions of nodes and segments to cover an area of spanning one or more countries, or part thereof.

In the context of devising a means of efficiently referencing or describing a location (i.e. a path through a road network), it is not only highly inefficient simply to provide an ordered list of all nodes (and/or segments, and optionally their attributes) within the digital map which form part of the location, but such a referencing method would necessitate that exactly the same digital map was used during any de-referencing which later occurred, for example in a mobile device to which the location reference was transmitted, because nodes, segments, lines and their attributes are practically only ever uniquely defined in a particular version of a map created by a particular map vendor. Even fundamental attributes such as longitude and latitude for a particular node might differ between different digital maps.

One particular attribute often provided in digital maps is a Traffic Message Channel (TMC) location table reference. TMC is a technology for delivering traffic and travel information to vehicle users, and more particularly to navigation systems (either portable or integrated) present within those vehicles and which include some form of digital map. A TMC message consists of an event code (which need not be traffic-specific, although these are most common) and a location code, often consisting of an ordered list of location references by means of which the location of the traffic event can be determined in the digital map and thus represented graphically on the screen of the navigation system. A number of pre-defined nodes in most commercially available digital maps are assigned a TMC location reference which is determined with reference to a limited location table. The location table consists of $2^{16}$ (65536) location references corresponding to a similar number of physical or real world locations, usually road intersections, also identifiable in the digital map.

Although TMC messages are very efficient in that they can be as short as 37 bits in length and therefore do not impinge significantly on available bandwidth for broadcast data, only a fixed number of location references are available, and therefore typically only motorways and major highways (or intersections thereon) in each country offering TMC can be referenced. There are various other disadvantages of TMC location references. For instance, TMC location tables are often maintained through a public authority or National Government, prone to change between update cycles, which are traditionally quite long, non-existent, or available only commercially, in some markets.

Of course, decoding a TMC location reference is intrinsically simple in that a simple queries can be performed in the digital map database for each TMC location code resulting in immediate identification of the relevant correct nodes and segments (each map provider will include TMC location codes as part of the map production process ensuring precision), and thus the location can be immediately resolved. However, as it is becoming possible to identify traffic build up on secondary and urban roads using GSM and GPS probe data (e.g. vehicles users increasingly possess either a mobile phone or a connected satellite navigation devices useful as probes), TMC location codes are simply inadequate as far resolution is concerned.

One attempt to overcome some of the limitations of TMC location references or map-specific references is the Dynamic Location Referencing project, also known as AGORA-C (in the process of standardization under no. ISO 17572-1, 2, and 3). Although a complete description of the AGORA-C location referencing approach is beyond the scope of this application, the fundamentals of the approach are that a location reference can be completely specified by a set of location points, specified by coordinate pairs of latitude and longitude and ordered in a list, each point complying with various rules but most importantly being consecutive in terms of the location being referenced and the previous point in the list, i.e. successive points form a next-point-relationship. As with other location referencing systems, each point is provided with a number of attributes which assist in better defining that point, but specific to the AGORA-C method is the identification of each point as one of a location point, an intersection point, a routing point, or some combination of these three. Each point along the location at which the road section signature changes is represented by an intersection point, so locations being paths over a road network and which pass through intersections without any road section signature change need not be referenced by an intersection point. For example, if a location includes a section of motorway which includes junctions that are not relevant as far as the location is concerned, then there is no need to include intersection points for such junctions. One of the earlier steps in the AGORA-C encoding method is the determination of all intervening intersection points between a first and a last intersection point along the location at which a change of road section signature occurs.

All these points are added to a table of points ultimately forming part of the AGORA-C location reference. Within this table, at least two routing points will also have been identified, again according to certain rules. Routing points are provided where an intersection points alone are insufficient to unambiguously determine the correct location in the decoder, and are either added as separate points, or where a required routing point coincides with existing intersection point, a simple attribute change on the latter is effected.

Although this referencing approach is comprehensive in that it is possible to accurately and repeatably encode and decode any location existing within a geographical information system, it is believed that that the system is excessive and possibly redundant in certain aspects, and a more efficient encoding and decoding system is possible. For instance, although the referencing method is independent of any pre-compilation work and is map-independent, the average AGORA-C message size is significantly higher than 30 bytes per location reference. In terms of the devices which might commonly decode location references, such as personal navigation devices, PDAs, mobiles, or in-car integrated navigation systems, it is desirable that the received message be as short as possible to enable rapid decoding and ultimate resolution of the location represented thereby.

It is therefore an object of this invention primarily to provide a method of resolving a location represented by structured data, typically a packet of binary data resulting from the encoding of an ordered list of location reference points representative of that location according to a physical data format specification, which is both economical in terms of required processing, and which nevertheless achieves very high success rates in terms of re-creating the correct location despite the relative brevity of received data regardless of the digital map used.

SUMMARY OF THE INVENTION

According to the invention, there is provided a method of resolving a location from an ordered list of location reference points being representative of nodes in an encoder digital map and each having attributes representative of a specific line or segment in said encoder digital map emanating from or incident at those nodes, comprising the steps of:

(i) for each location reference point, identifying at least one candidate node existing in a second digital map, and, using the available attributes of that location reference point, identifying at least one candidate line or segment existing in said second digital map emanating from or incident at said candidate node, (ii) performing a route search within said second digital map between:
   at least one of said at least one candidate node and the corresponding candidate line or segment emanating therefrom or incident thereat, and
   at least one of a candidate node for the next location reference point appearing in the list and the corresponding candidate line or segment emanating therefrom or incident thereat,
   and extracting from said second digital map each line or segment forming part of the route so determined between said candidate nodes, (iii) repeating step (ii) for each consecutive pair of location reference points up to and including the final location reference point appearing in the list.

Preferably, the route search is a shortest path route search, or includes an element which is fundamentally related to the distance between the start and end point used as inputs to the route search. Different types of route searches may therefore be considered, such as Dijkstra's algorithm or A*.

Preferably, the route search operates on respective pairs of successive candidate nodes, and includes a means of ensuring that the corresponding line or segment of the first of the pair of nodes forms part of the route resulting therefrom.

Preferably the candidate nodes identified are real nodes in that they are representative of real world intersections, which in all probability will therefore be present in said second digital map.

Preferably, the step of extracting each line or segment from the second digital map is enhanced by storing each of said extracted lines or segments in a location path list. Furthermore, each location path list thus created for each successive route search is preferably either concatenated in a final step or alternatively each of the extracted lines or segments for a succeeding route search are appended to the pre-existing location path list, the ultimate effect being the same, that is to provide a means of completely identifying the location.

Preferably, in the case where more than one candidate node is identified for a location reference point, the method includes the further step of rating said identified candidate nodes according to one or more prescribed metrics, and thus identifying a most likely candidate node or providing a ranking of candidate nodes. Also preferably, in the case where more than one candidate line or segment existing in the second digital map is identified for a candidate or most likely candidate node, then the method includes the step of similarly rating those candidate lines or segments resulting in the identification of a most likely candidate line or segment or providing a ranking of candidate lines or segments.

In a preferred embodiment, the step of rating one or both of the candidate nodes and candidate lines or segments is achieved by applying a rating function. Preferably, the rating function includes a candidate node rating part and a candidate line or segment rating part.

Most preferably, the candidate node rating part of the rating function includes some dependence on a representative or calculated distance between the location reference point or its absolute coordinates, and said candidate nodes or their absolute coordinates as appearing in and extracted from said second digital map.

Most preferably, the candidate line or segment rating part of the rating function includes a means of assessing the similarity of the line or segment attributes as appearing in the encoder digital map and those appearing in the second digital map used in resolving the location.

Further preferably, the method includes the further steps of:
determining, from the second map, a path length value for each path between successive candidate nodes within said second digital map, said path being established as a result of the route search between said successive candidate nodes,
comparing the path length value so determined with a DNP attribute of the first of the two location reference points used in the route search, and
in the event of too great a discrepancy between the path length value and the DNP attribute, either repeating the route search using alternative candidate nodes and/or lines for one or both of each successive pair of location reference points to attempt to reduce the discrepancy between path length value and DNP attribute, or reporting an error.

Further preferably, the method includes the final step of applying any offset value which may be associated with the first and last location reference points to the first and last lines in the resulting list of lines or segments present in the second digital map and which together provide a complete and continuous representation of the location.

In a second aspect of the invention, there is provided a computer program element comprising computer program code means to make a computer execute the method as set out above. In a yet further aspect, there is provided such a computer program embodied on computer readable medium.

In a third aspect of the invention there is provided a computing device, optionally handheld, and being one of a personal navigation device (PND), a personal digital assistant (PDA), mobile telephone, or indeed any computing apparatus capable of executing the computer program set out above, and including as a minimum a processor and storage in which said program can reside, said storage also including a digital map, and means for information output. In most embodiments, the means for information output will consist of a display screen on which a graphical representation of said digital map can be displayed. In a preferred embodiment, the resolved location or a portion of it, is displayed in superposed, overlaid, juxtaposed or in conjunction with the relevant portion of the digital map to which it relates. In alternative embodiments, the computing device may only or additionally include audio information output means.

The present invention provides exceptional advantage over known techniques in that a potentially lengthy location can be resolved using only relatively few location reference points and their corresponding attributes. From these basic elements, candidate nodes and lines or segments can be identified with reference to any modern digital map, as the invention takes advantage of the fact that most modern digital maps include practically every road intersection and provide a node for them. Furthermore, the majority of digital maps also include at least some basic attributes for the form and class of roads between such intersections. If such are present in the second digital map used in the resolution process, then it is possible to make a comparison of the attributes and make a judgement as to whether one line or segment identified in the second digital map is more suitable than another. Finally, the invention makes use of a bearing calculation to further and better identify candidate lines in the second digital map, and to provide a means of ranking them where many candidate lines are identified.

It should be mentioned that the bearing attribute is a calculated attribute both on the encoder side and during the resolution method and not one generally forming part of the digital map. However, it can be accurately calculated and it is found to be very useful in accurately identifying and/or rating candidate lines.

The shortest path route search is also useful as it is one of the simplest route search algorithms available, well known and rapid to implement and execute. A further useful advantage is the route search algorithm employed in the encoder need not necessarily be the same as that used during resolution of the location post-transmission. For example, it is possible to implement an A* on encoder side and a Dijkstra algorithm on decoder side. As both these algorithms are based primarily on a distance parameter between start and end point, they will result in the same route. In the case of A*, it should be mentioned that the heuristic element of the A* algorithm would need to meet certain requirements, but in all practical cases, this would in any event be the case. Accordingly, in the present invention, it is only required that a shortest-path is found. In real road networks, the shortest path is usually unique, but one can imagine exceptional circumstances, such artificial grids or short routes around rectangular road layouts in cities where more than a single shortest path route may be identified.

Further advantages of the invention will become apparent from the following specific embodiment of the invention which is described by way of example with reference to the accompanying drawings.

BRIEF DESCRIPTION OF THE DRAWINGS

FIG. 2 illustrates an example network, FIG. 3 illustrates a location path desired to be encoded within that network, FIG. 4 illustrates the shortest path between start and end nodes of an extended path which partially includes that location, and FIG. 5 illustrates the location reference points required to completely reference that location, FIGS. 6-11 provide schematic representations of a second digital map including nodes and segments and in particular

DETAILED DESCRIPTION

The following description of the invention is provided in terms of segments, but it is to be understood that the method can be applied equally to lines, or to combinations of lines and segments which together are representative of a continuous path through a road network.

It is useful in the context of the present invention to firstly provide a brief description of the manner in which a location reference is encoded, and the particular logical and physical data formats used in the encoding process. The latter are provided as an Appendix to this specification, and reference to this Appendix is to be had throughout the following description.

Figure 2:
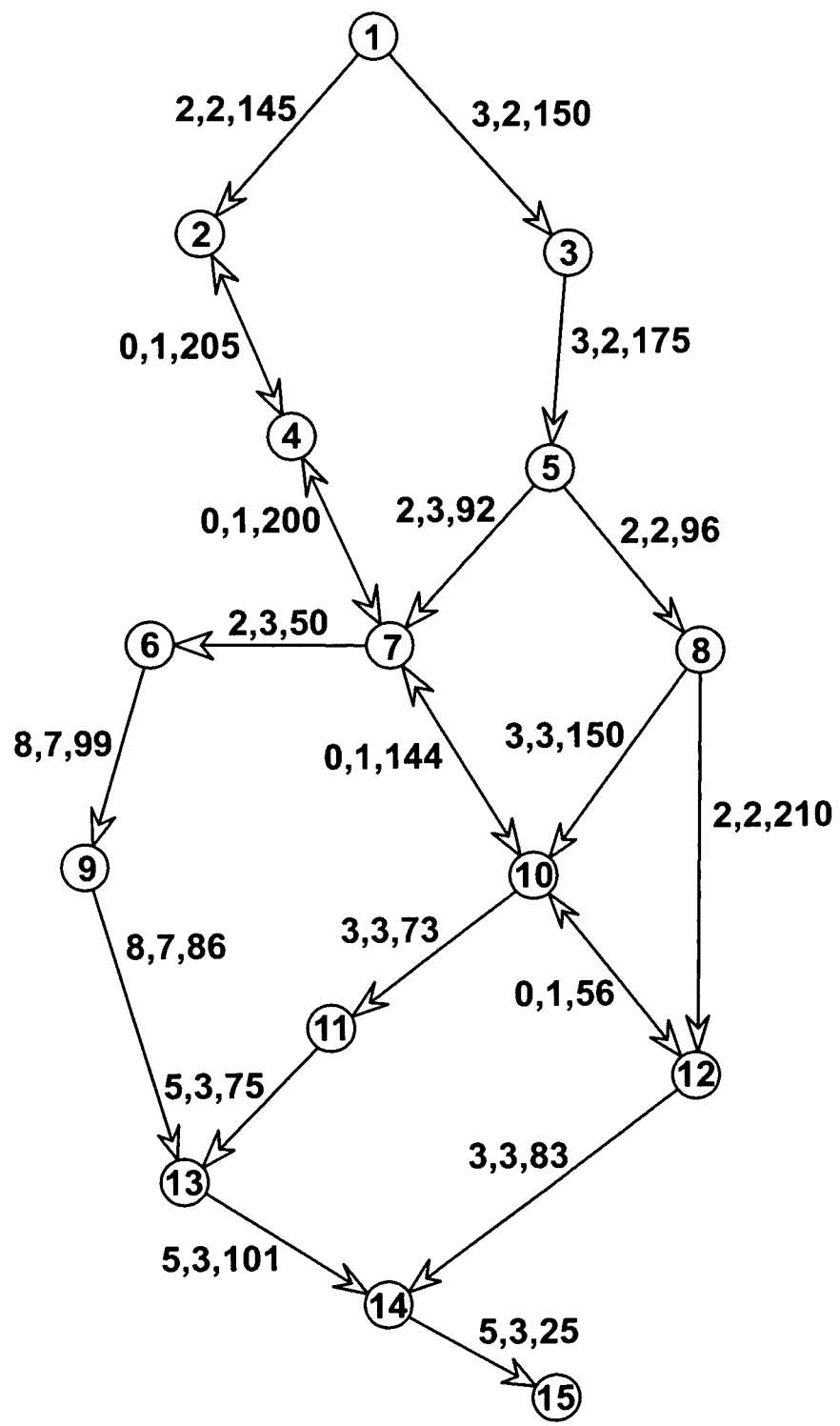
FIGS. 2-5 provide schematic representations of a first digital map including nodes and segments and in particular

Referring firstly to FIGS. 2-5, a first (encoder) digital map is shown in FIG. 2 and consists of 15 nodes and 23 lines (two-way lines are counted twice). The nodes are numbered from ▢ to ▢. The necessary line attributes are shown beside every line using the format: <FRC>, <FOW>, <Length in meter>. FRC is an abbreviation for "Functional Road Class" and FOW is an abbreviation for "Form of Way", both of which are described in greater detail in the Appendix below. The arrowheads indicate the possible driving direction for each line.

Figure 3:
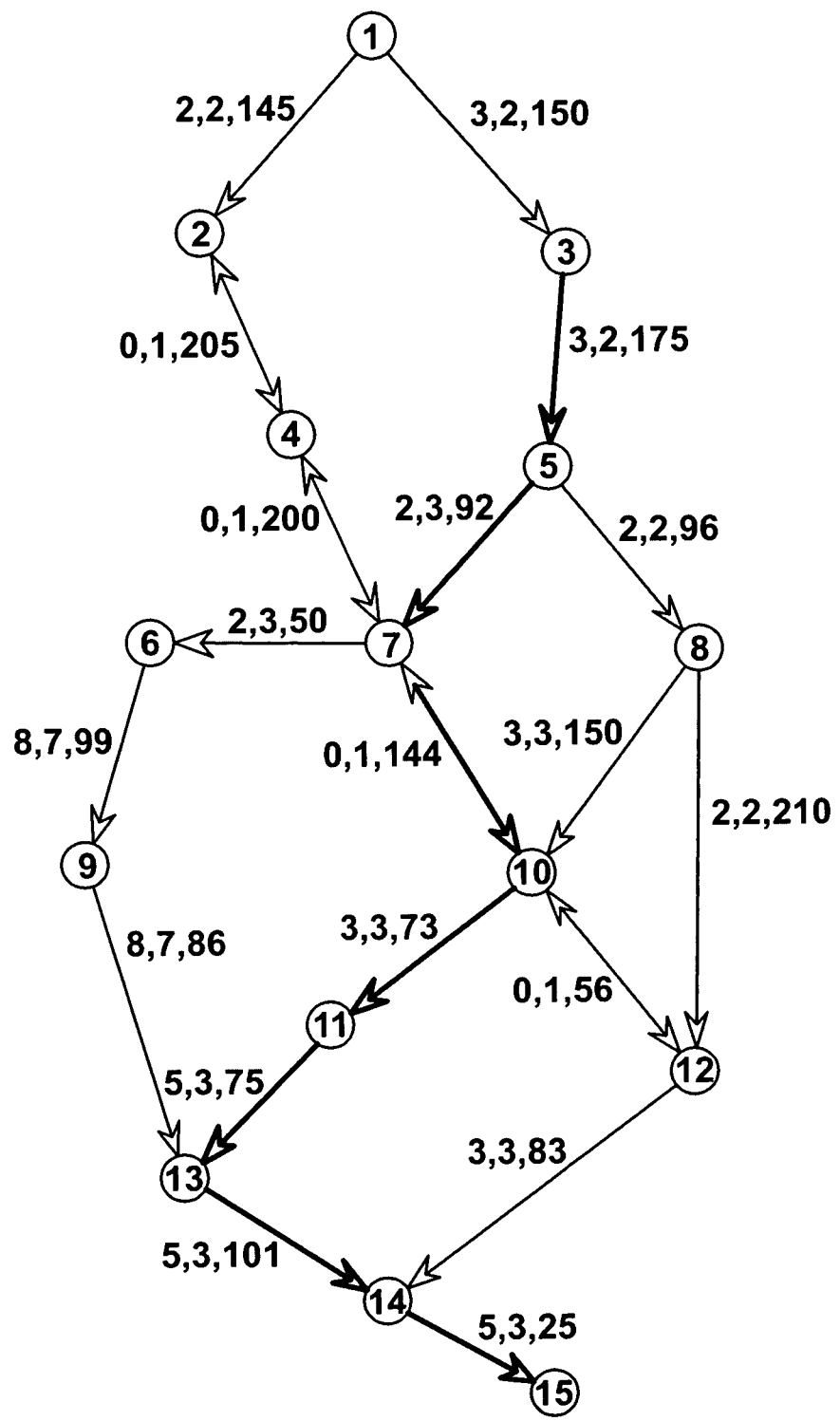
Figure 4:
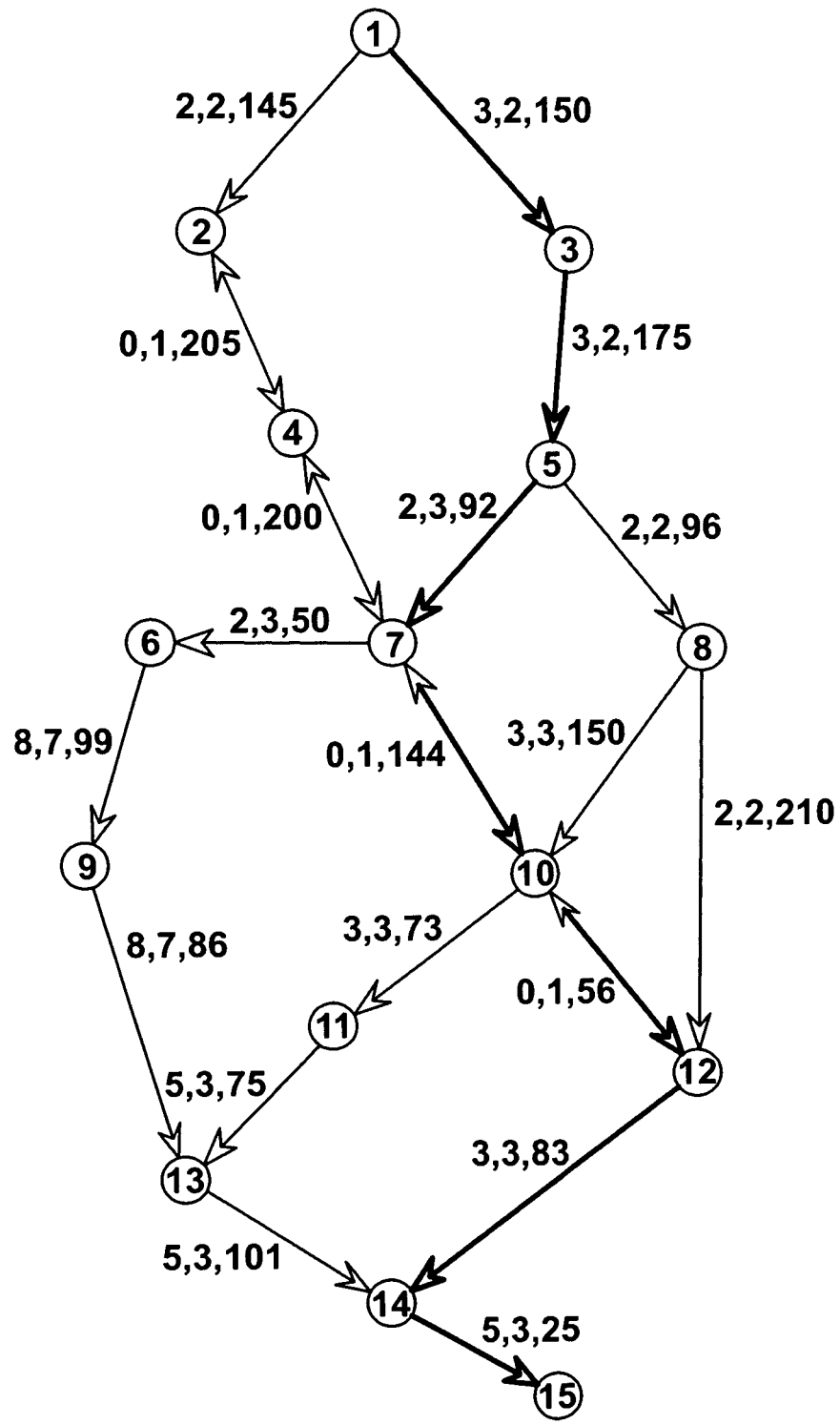

The location to be encoded is shown in FIG. 3 using bold lines. The location starts at node ▢ and continues over the nodes ▢, ▢, ▢, ▢, ▢, ▢ and ends at node ▢. Its total length in the encoder map is 685 meters. The ordered list of lines and the map to be used during encoding serves as input for the encoder.

Encoding:

In the first step of the encoding process the location will first be checked for validity. Since the location is connected and drivable and all functional road classes along the location are between 0 and 7, this location is considered valid. While it is possible in the encoding process to include a check as to whether turn restrictions within map data are enabled or not, this step is omitted for brevity here.

The encoder second step is to check the start and end node of the location as being real nodes according to certain predetermined data format rules. The end node ▢ has only one incoming line and is therefore valid. The start node ▢ also has two incident lines but here it is one outgoing and one incoming line. Therefore this node is not valid and the encoder searches for a real node outside the location. The encoder will find node ▢ to be a real node and it also expands the location uniquely. Node ▢ is chosen as the new start node for the location reference and there will be a positive offset of 150 meters. The total length of the location reference path results in 835 meters.

The third step of encoder is to proceed to calculate a shortest-path between the start line (line between nodes ▢ and ▢ and the end line (line between nodes ▢ and ▢) of the location. The resulting shortest-path is outlined in FIG. 4 using bold lines. The shortest-path has a length of 725 meters.

The next (4$^{th}$) step of the encoding process is now to check whether the location is covered by the calculated shortest-path. It will determine that this is not the case and there is a deviation after node ▢.

According to the principles outlined in applicant's co-pending application of even date, the encoder will determine the line from node ▢ to ▢ as becoming a new intermediate location reference point. Node ▢ is a real node since it cannot be stepped over during route search and the shortest-path to this line covers the corresponding part of the location completely. The length of the location being covered after this first shortest-path calculation is 561 meters.

The next encoding step prepares the route calculation in order to determine a shortest-path for the remaining part of the location (from node ▢ over ▢, ▢ and ▢ to ▢). The shortest-path calculation will therefore start at the line from ▢ to ▢ and ends at the line from ▢ to ▢.

The encoder returns to step 3 above and will determine a shortest path (length: 274 meters) between ▢ and ▢ and step 4 above will return that the location is now completely covered by the calculated shortest paths.

Figure 5:
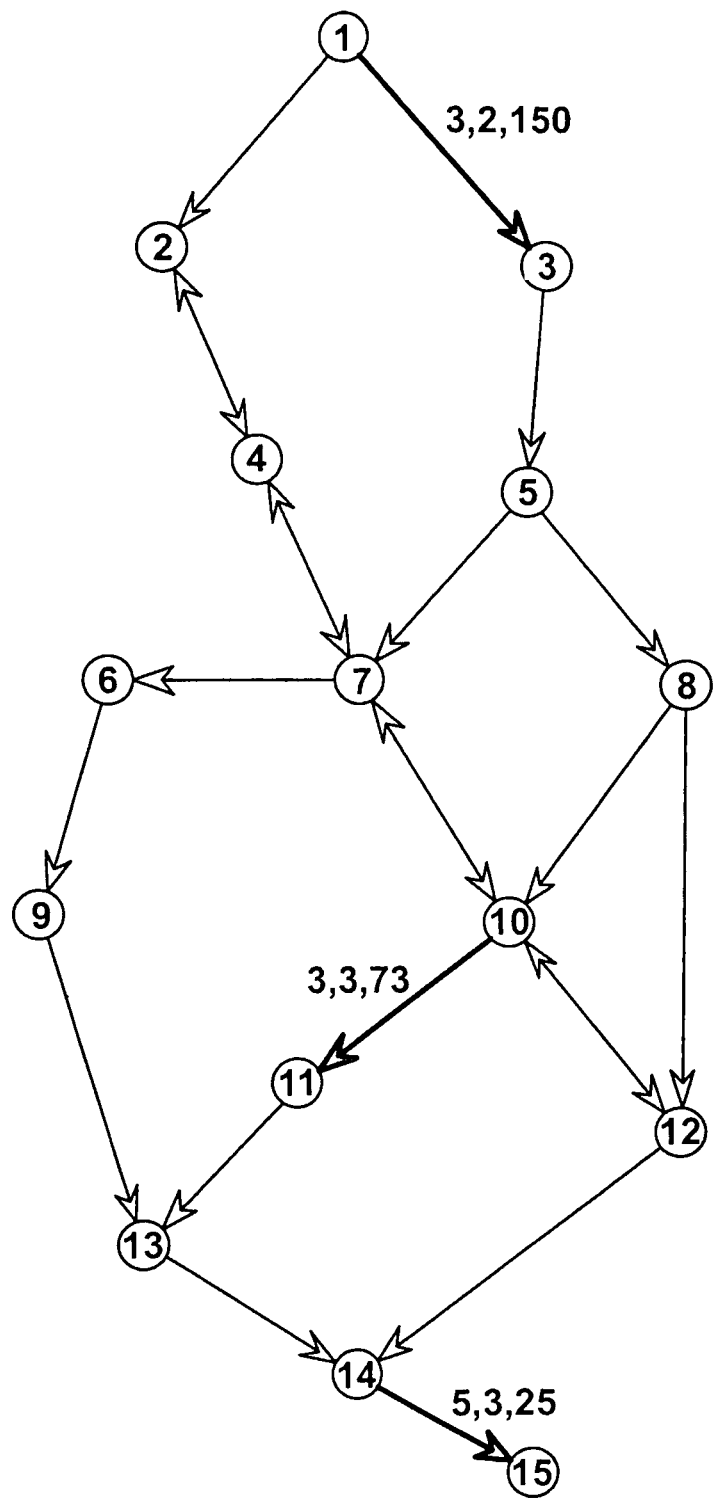

As a next step, the location reference path will be composed of the two shortest-paths and the ordered list of location reference points will now be formed. FIG. 5 shows the lines in bold which are selected for the location reference points. The first location reference point points to the line from node ▢ to ▢ and indicates the start of the location reference path, the second location reference point points to the line from node ▢ to ▢ and this line was necessary to avoid the deviation from the location. The last location reference point points to the line from node ▢ to ▢ and indicates the end of the location reference path.

The final step (excluding any intervening validity checks) is the conversion of the ordered list of LRPs into a Binary location reference, and the description provided in the Appendix hereof for both the Logical Data Format and Physical Data Format as prescribed by the applicant will assist in the reader's understanding. It is to be emphasised that the description provided in the Appendix and providing details of the specific formats is provided only as an example, and the skilled reader will appreciate that other formats are possible.

Turning now to the present invention, the physical data ultimately transmitted is a binary representation of the three location reference points identified above and includes attribute data in order that the appropriate lines can be identified. One of the fundamental bases for this invention is that there is a strong possibility that the digital maps used in the encoder and decoder will be different. Of course, they may be the same in which case the location may be resolved slightly more quickly as candidate nodes lines will be more exactly and quickly identified, but in any event, the method of the invention must still be applied.

Figure 6:
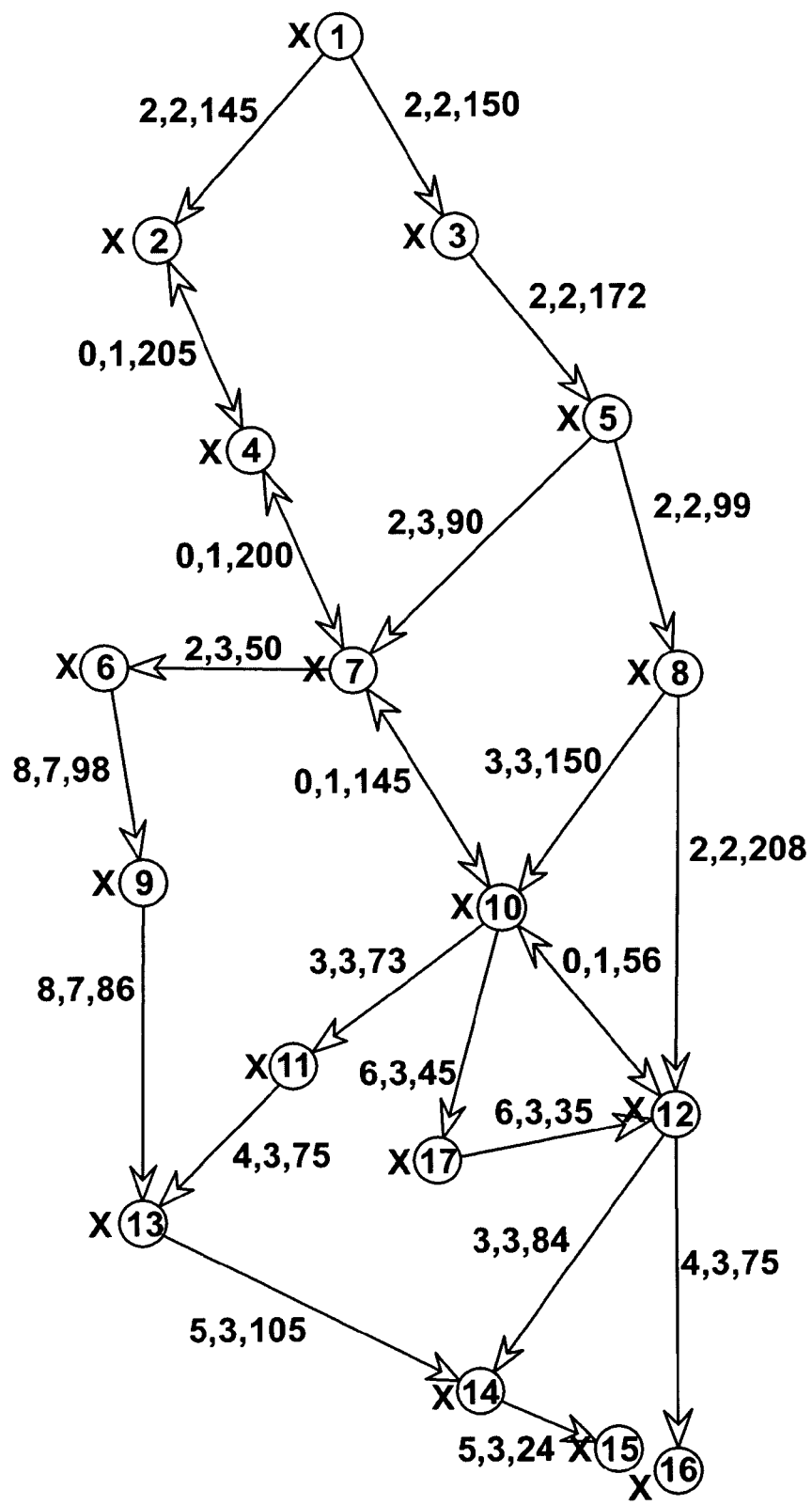
FIG. 6 illustrates the network of FIG. 2 but as represented by nodes and segments appearing in the second digital map.

Referring to FIG. 6, which shows the representation of the same portion of a road network as that shown in FIG. 2, but according to a different, second digital map. A comparison of the two Figures will immediately identify that there are material differences in the number and position of both nodes and lines.

Figure 1:
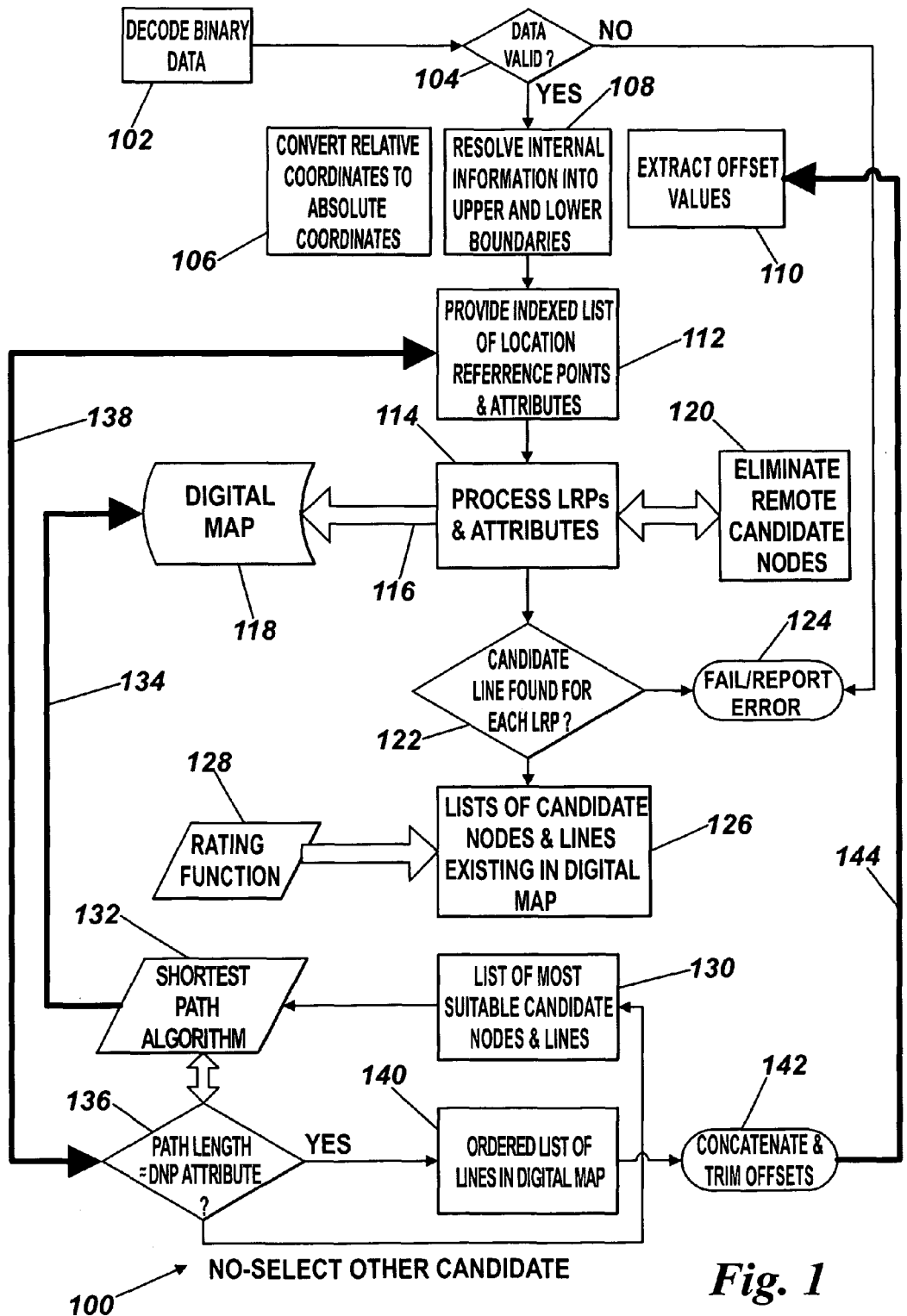
FIG. 1 shows a schematic flowchart of the method of the present invention.

Referring also to FIG. 1 in which an overview flowchart 100 of the process according to one embodiment of the invention is shown, the first step 102 in the process is to decode the incoming or wirelessly transmitted (most commonly in the case of a mobile device) binary data (or XML or other machine-readable representation) resulting from the earlier encoding process and structured according to the physical data format. The decoding of this binary data is not an essential element of the invention, which applies to the resolution of a location from a list of location reference points—the decoding of the binary data is merely a means of identifying the requisite location reference points.

At step 104, a validity check is performed—failure at this initial step will result in termination of the procedure and the reporting of an error as indicated at 124. It should be mentioned that the encoding process and reduction to physical format is a lossy process, and therefore the information extracted from the binary data will not be as accurate as before creating the binary stream. On account of the usage of intervals for the bearing and the distance to next point (DNP) the exact value cannot be extracted and therefore precision is limited to a small interval containing the exact value.

The information being extracted from the binary data example is shown in Tables 1, 2 and 3 (and is further referenced in FIG. 1 at steps 106, 108, and 110 respectively).

TABLE 1

Decoded coordinates

| LRP index | Longitude | Latitude |
|---|---|---|
| 1 | 6.12682° | 49.60850° |
| 2 | 6.12838° | 49.60397° |
| 3 | 6.12817° | 49.60304° |

TABLE 2

Decoded LRP information

| LRP index | FRC | FOW | Bearing | LFRCNP | DNP |
|---|---|---|---|---|---|
| 1 | FRC3 | MULTIPLE_CARRIAGEWAY | 135.00°-146.25° | FRC3 | 527.4 m-586.0 m |
| 2 | FRC3 | SINGLE_CARRIAGEWAY | 225.00°-236.25° | FRC5 | 234.4 m-293.0 m |
| 3 | FRC5 | SINGLE_CARRIAGEWAY | 281.25°-292.50° | — | 0 m |

TABLE 3

Decoded offset information

| Offset | Value |
|---|---|
| Positive offset | 117.2 m-175.8 m |
| Negative offset | - no offset available - |

This information is sufficient to resolve the location on the decoder map shown in FIG. 6. This map consists of 17 nodes and 26 lines (two-way lines are counted twice). To avoid confusion, all nodes referenced in the decoder map are prefaced with "X".

This map differs from the encoder map (see FIG. 2) in several ways. Some length values are different (e.g. line from node $X_?$ to $X_?$), some functional road class values have changed (e.g. line from node $X_?$ to $X_?$) and there are two more nodes $X_?$ and $X_?$ and also additional lines connecting these new nodes. The challenge of the decoder is to resolve the location in this different map.

Figure 7:
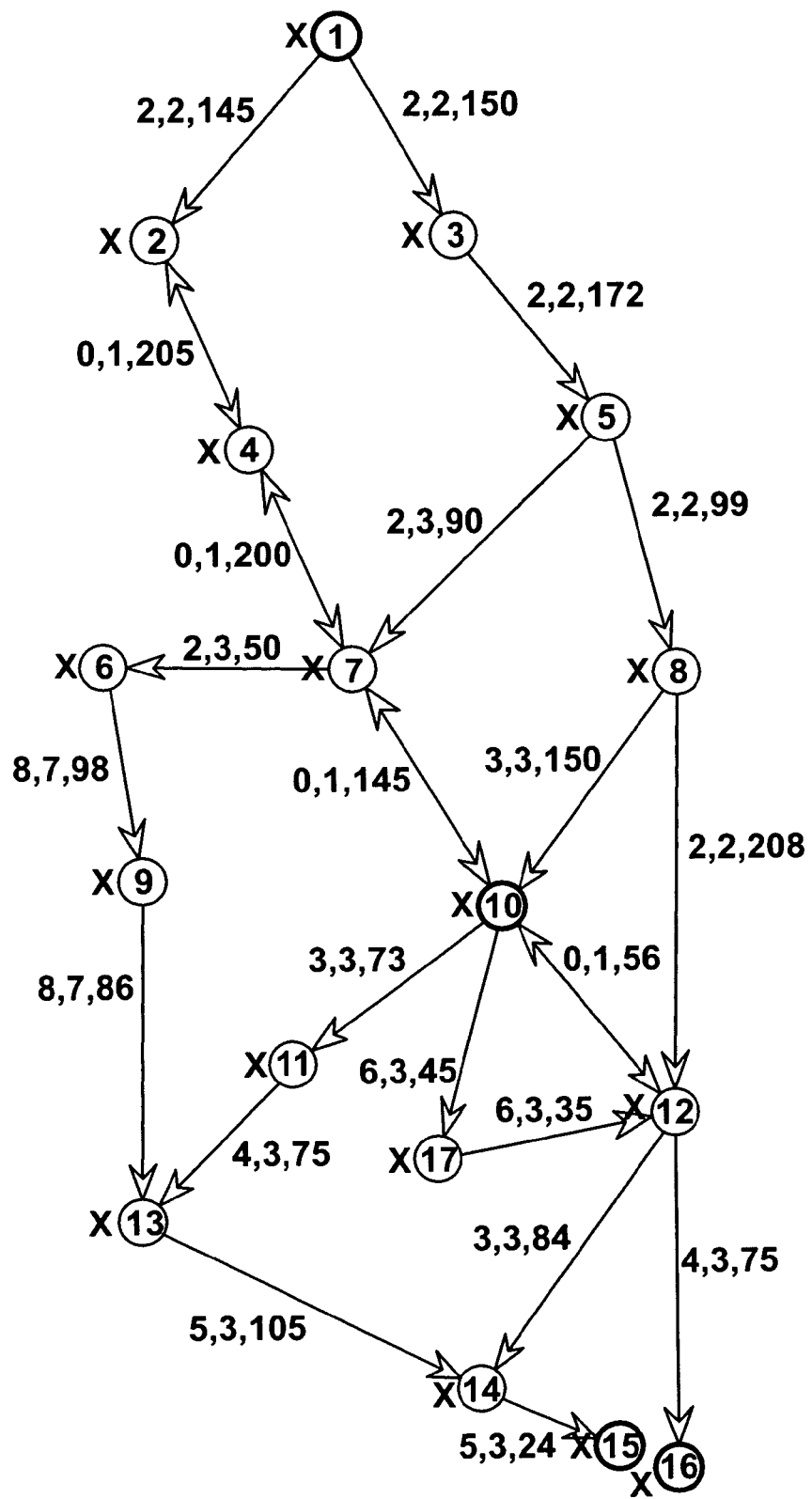
FIG. 7 illustrates candidate nodes identified within the second digital map.

After validating the data, and providing a list of decoded location reference points (LRPs) and their attributes, as indicated at step 112 in FIG. 1, the decoder then begins processing each LRP in the list at step 114 to firstly determine candidate nodes for each LRP. The result of this processing, which quite simply effected by using the LRP coordinates and identifying the nearest node(s) appearing in the decoder digital map 118 (as indicated generally at 116) is to provide a list of candidate nodes for each LRP. Map Nodes being distant from the LRPs by greater than a predetermined threshold value can be eliminated, as shown at 120. FIG. 7 shows the candidate nodes (bold circle) which are positioned close by the coordinates of the location reference points. For the location reference point 1 and 2 (In tables 1 & 2 above), in this example, there exists only one candidate node but for the last location reference point two candidate nodes $X_?$ and $X_?$ are possible.

Figure 8:
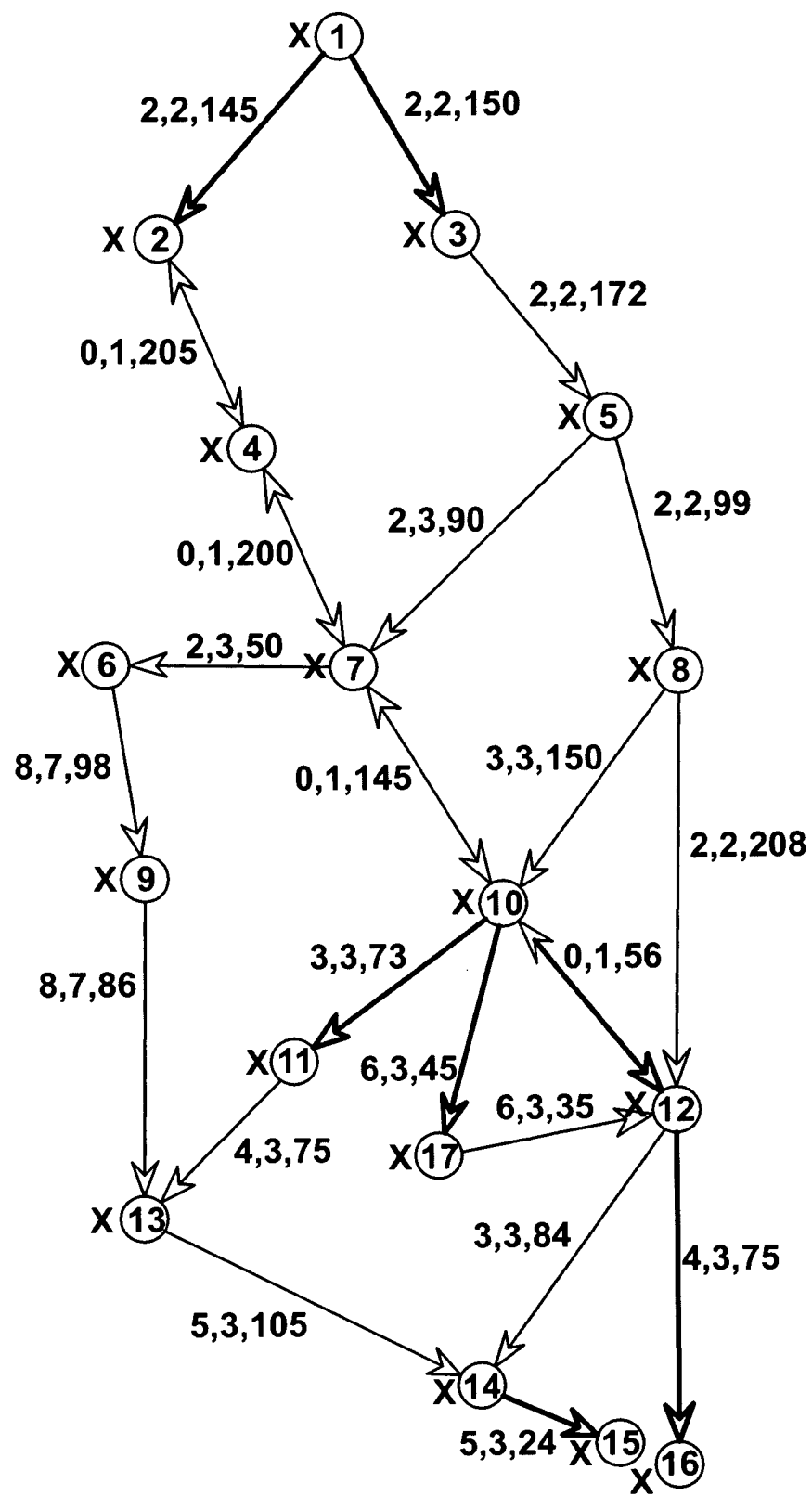
FIG. 8 illustrates the candidate lines identified within the second digital map.

Also as part of the processing of the LRPs and their attributes, candidate lines for each location reference point are also identified. The bold lines in FIG. 8 are the candidate lines for this example. The first LRP is represented by candidate point $X_?$ which in turn has two outgoing lines as candidates, the second LRP having candidate point $X_?$ has three outgoing lines as candidate and the last location reference point has two incoming lines (one for each candidate node $X_?$ and $X_?$). If the processing conducted at 114 fails to identify a candidate line for any of the LRPs, then the process must fail, as indicated at 122, 124. Once the processing is complete, list(s) of candidate nodes and lines for each LRP are provided at 126.

In one embodiment of the invention, and particularly where more than one candidate node and/or line is identified for each LRP, some means of rating or ranking the candidates is preferably required. Accordingly, a rating function 128 is applied to the lists of candidate nodes and/or lines (preferably both) according to their compliance with the attributes of the location reference point. Generally, the important aspect to the rating function is that its application will result in a ranking of one but preferably both of the candidate nodes and lines according to one or more metrics. The skilled reader will appreciate that many different mathematical and/or statistical bases exist for rating functions, and in the context of this application therefore it is sufficient to explain that a rating function or part thereof specific to nodes may include some measure of the distance of candidates to the physical or geographic position of the decoded LRP, and that a rating function or part thereof specific to candidate lines will include some means of assessing the correlation between the type of candidate line identified and those represented in the decoded data, and possibly also some bearing of those candidate and identified lines.

Figure 9:
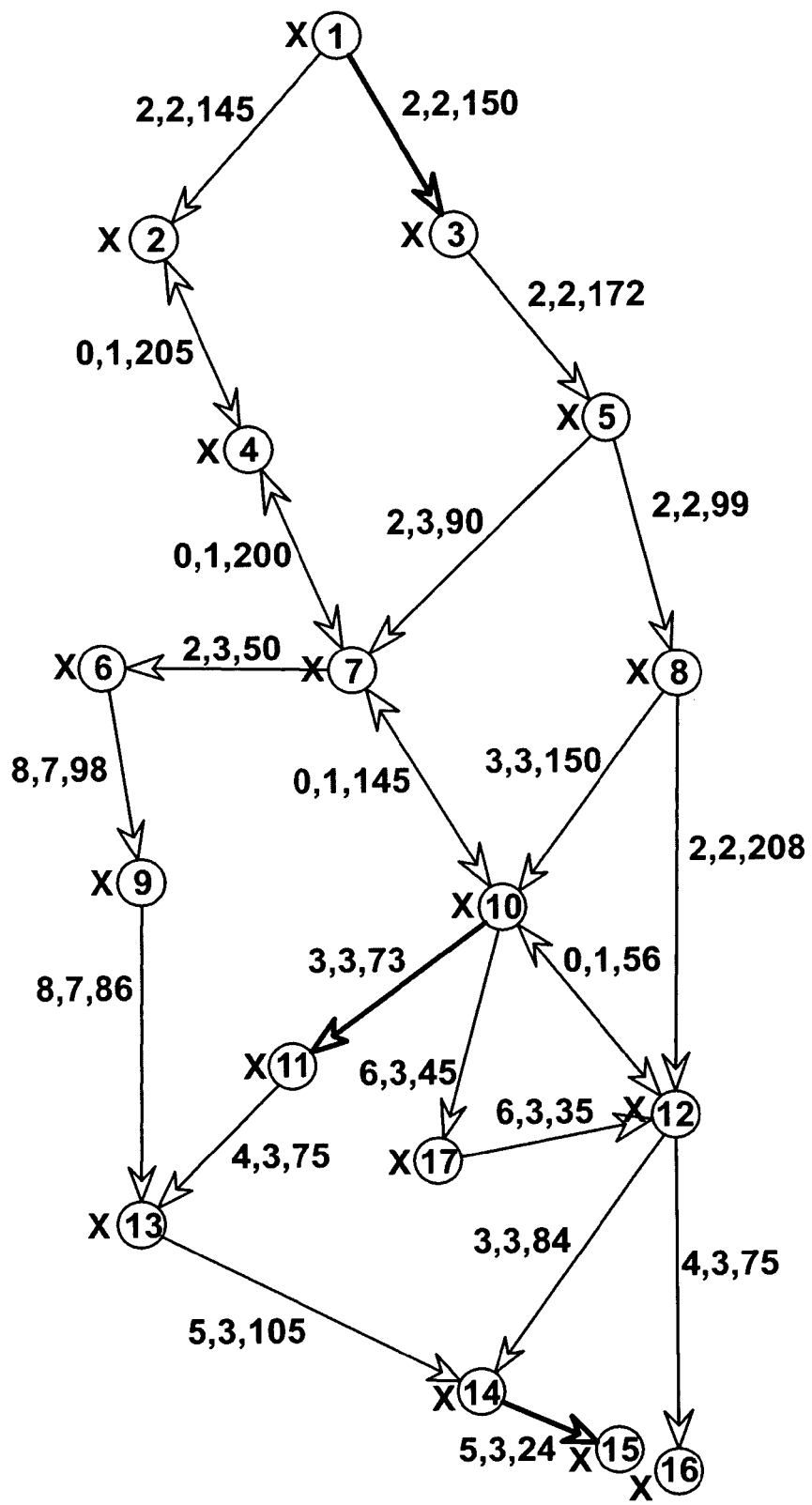
FIG. 9 illustrates the most likely candidate lines by which the location is completely referenced.

Once the rating function has been applied, most likely candidates are identified at step 130 in FIG. 1, and this can be seen in the network illustrated in FIG. 9—specifically, the most likely candidate lines are those between nodes $X_?$ and $X_?$, between $X_?$ and $X_?$, and between $X_?$ and $X_?$. These lines will be used for the following shortest-path calculation in step 132 of the resolution process.

Figure 10:
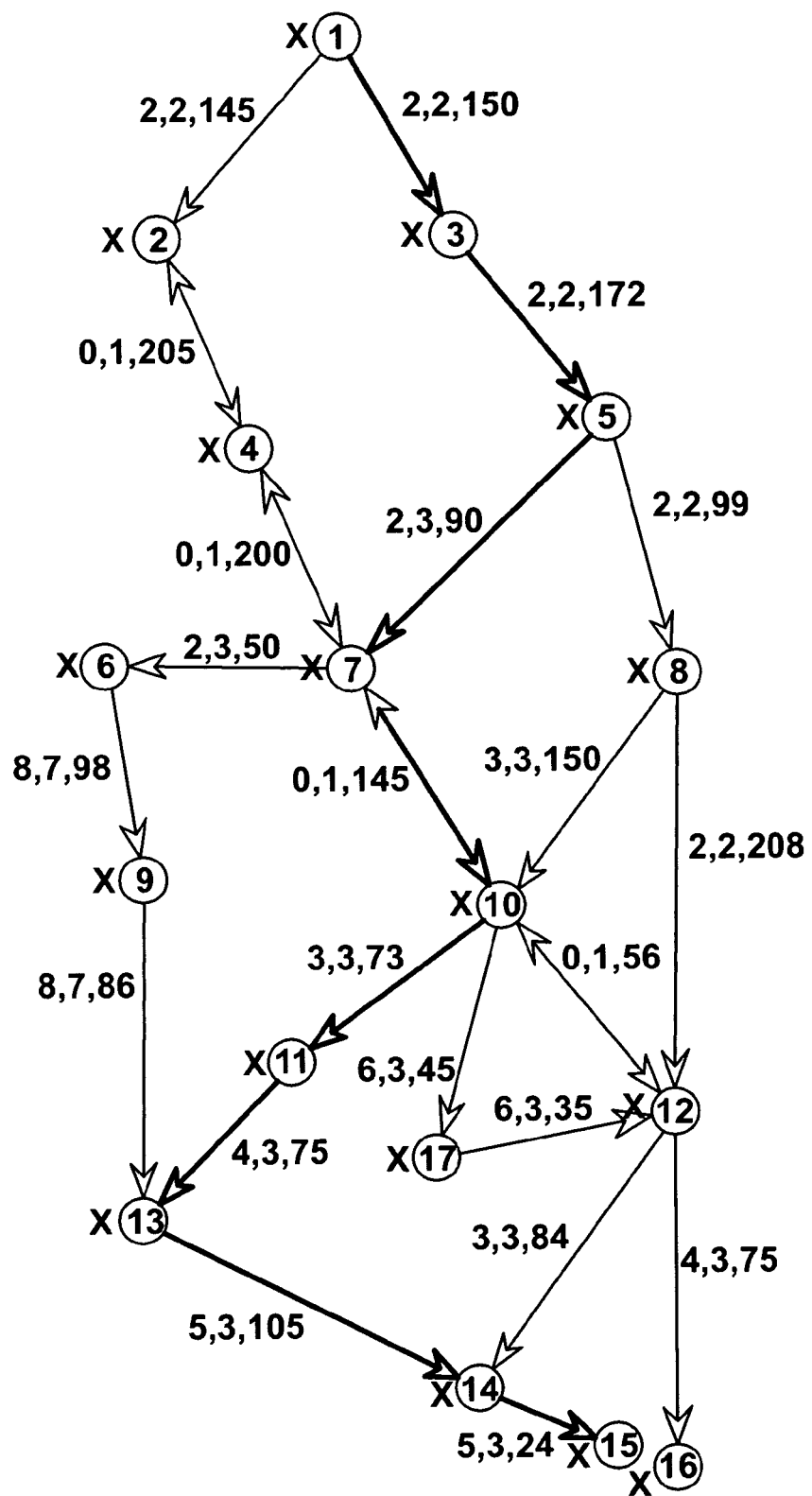
FIG. 10 shows the shortest path as algorithmically determined between the most likely lines.
Figure 11:
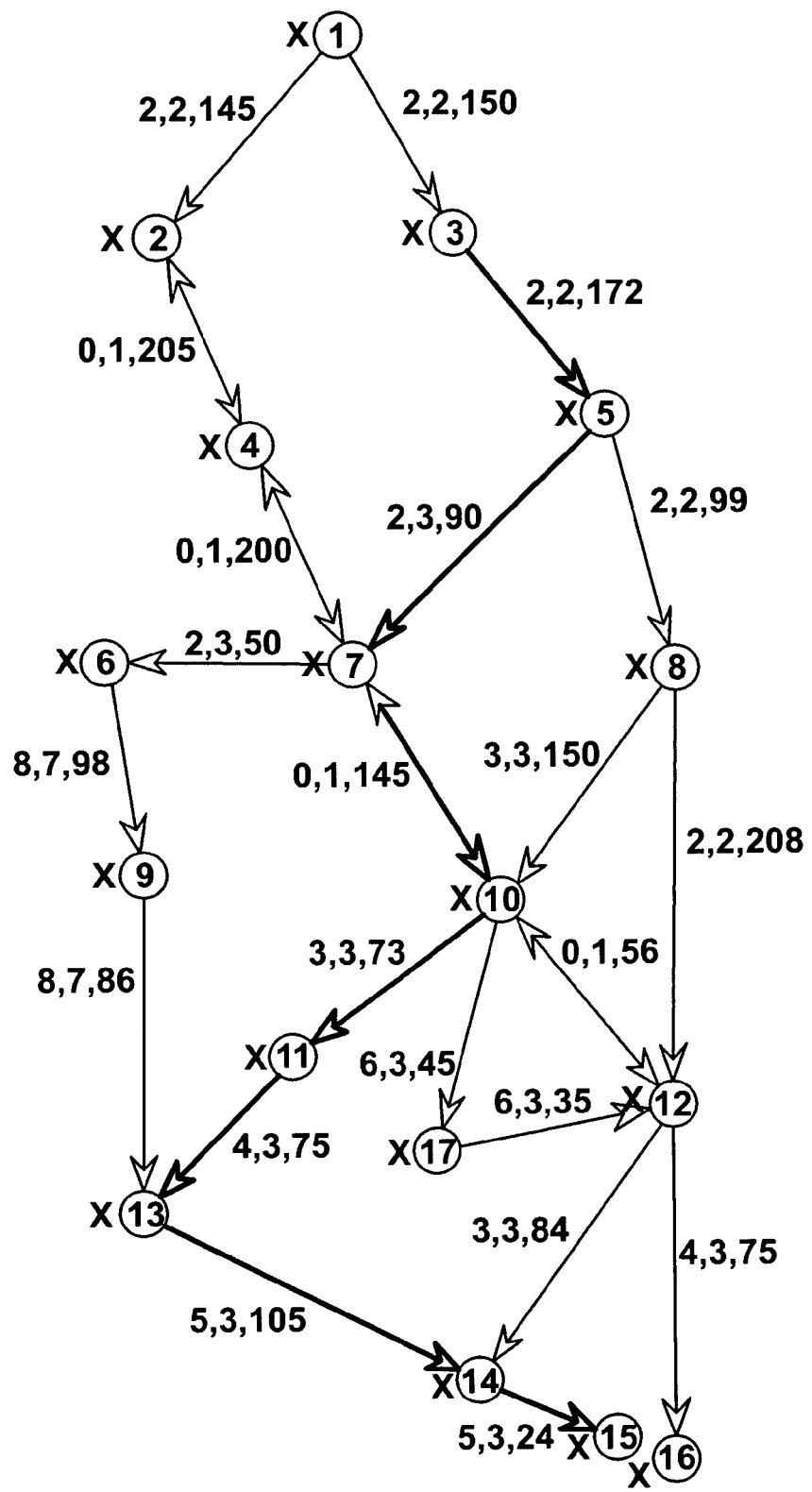
FIG. 11 shows the location as resolved, FIGS. 12-20 provide various schematic illustrations useful in the context of the logical and physical data formats, described below, and specifically.

The shortest-path calculation is performed on each successive pair of LRPs starting with the first and the second LRPs, and as shown by arrow 134 in FIG. 1, this shortest path algorithm determines a route through the digital map 118 using said most likely candidate nodes and lines resulting ultimately in the identification of the route shown in FIG. 10. Each shortest path so determined may be validated in step 136 by determining a path length value between the start node and end node of that path, and then comparing this value to the available DNP attribute specified in the data for each LRP, as indicated by arrow 138. The length of the first shortest-path (from node $X_?$ to node $X_?$) is 557 meters and this value fits into the DNP interval of the first LRP seen above in Table 2 (527.4 meters-586.0 meters). The length of the second shortest-path (from node $X_?$ to node $X_?$) is 277 meters and this value also fits into the DNP interval of the second LRP (234.4 meters-293.0 meters). The shortest-paths are therefore validated and the decoder does not fail but instead proceeds to steps 140 and 142, firstly providing a concatenated format, i.e. an ordered list of all the lines present in the complete path, and finally in step 142, trimming the concatenated shortest-path according to the offsets retrieved as shown schematically by arrow 144. In this example, only a positive offset is provided and therefore the shortest path is trimmed at its start, as clearly shown in FIG. 11. The only node fitting in the positive offset interval (Table 3 above, 117.2 meters-175.8 meters) is node $X_?$.

As can be seen from the above, the present invention provides a highly reliable and efficient method of resolving a location from received encoded data.

The particulars of the logical and physical data formats are now provided by way of example. The reader should be aware that the following Appendix provides only one of many possible specific definitions for these formats.

APPENDIX-A

Specification for Logical Data Format & Physical Data Format

The following table explains common terms and abbreviations used in this document and in the context of location referencing:

TABLE A1

Explanation of common abbreviations

| Abbreviation | Description |
| --- | --- |
| AF | Attribute Flag - a flag which indicates that the binary representation of the location reference includes attribute information |
| ArF | Area Flag - a flag which indicates that the location reference describes an area |
| BEAR | Bearing - angle between the direction to a point in the network and a reference direction (here: the true North) |
| COORD | Coordinates - a pair of two values (longitude and latitude) representing a position in a two-dimensional network |
| DNP | Distance to Next Point - the length in meter to the next location reference point (measured along the location reference path between these two LRP) |
| FOW | Form Of Way - Certain aspects of the physical form that a line takes. It is based on a number of certain physical and traffic properties. |
| FRC | Functional Road Class - A classification based on the importance of the role that the line performs in the connectivity of the total road network. |
| lat | Latitude - geographic coordinate used for north-south measurement |
| LFRCNP | Lowest Functional Road Class to Next Point |
| lon | Longitude - geographic coordinate used for east-west measurement |
| LRP | Location Reference Point - a point of the location which holds relevant information enabling a map-independent location reference; typically a collection of information describing an object in the map; consists of a coordinate and additional information about a line in the map. |
| NOFF | Negative Offset - distance in meter along the location reference path between the real end of the location and the end of the location reference path |
| NOffF | Negative Offset Flag - a flag which indicates that a negative offset is included in the location reference |
| POFF | Positive Offset - distance in meter along the location reference path between the start of the location reference path and the real start of the location |
| POffF | Positive Offset Flag - a flag which indicates that a negative offset is included in the location reference |
| RFU | Reserved for future use - a bit in a binary stream which does not have a use yet |
| VER | Version - Version information |

1. Data Format

A location reference is a description of a designated part of a digital map or a sequence of geographical positions. For this description we use the model of location reference points (LRPs, see 1.1.1).

A location reference for line locations contains at least two LRPs but there is no maximum number of LRPs defined. The location reference path is the path in the digital map described by the LRPs and can be found by a shortest-path calculation between each consecutive pair of LRPs.

1.1 Logical Data Format Specification

The logical data format describes the logical model for location references according to the MapLoc™ standard.

1.1.1. Location Reference Point (LRP)

The basis of a location reference is a sequence of location reference points (LRPs). Such a LRP contains a coordinate pair, specified in WGS84 longitude and latitude values and additionally several attributes.

The coordinate pair (see 1.1.3.1) represents a geographical position within a map/network and is mandatory for a LRP. The coordinate pair belongs to a "real" node within a network.

The attributes (see section 1.1.3.2 to 1.1.3.6) describe values of a line within a network at which the line is incident to the node described by the coordinate pair. In this context it is not defined if the attributes refer to an incoming or outgoing line regarding the node. This will be specified in section 1.2.

1.1.2. Topological Connection of LRPs

Figure 12:
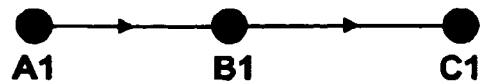
FIG. 12 shows the required consecutive connection of location reference points (LRPs)

Referring to FIG. 12, The location reference points shall be stored in a topological order or "next point"—relationship of successive LRPs. The last point in this order will have no next point in this relationship.

FIG. 12 shows an example of this relationship. The LRPs are indicated by A1, B1 and C1 and the black lines and arrows indicate the order of the points from A1 to C1 in the location reference path. In this example the LRP A1 will have B1 as next point, B1 will have C1 as next point and C1 will have no next point.

1.1.3. Components of LRPs

This section describes the components of a location reference point.

1.1.3.1 Coordinate Pair

Coordinate pair stands for a pair of WGS84 longitude (lon) and latitude (lat) values. This coordinate pair specifies a geometric point in a digital map. The lon and lat values are stored in a decamicrodegrees resolution ($10^{-5}$, or five decimal points).

Abbreviation: COORD Type: (float, float)

1.1.3.2 Functional Road Class

The functional road class (FRC) is a road classification based on the importance of a road. The possible values of the FRC attribute are shown in Table A2. If there are more FRC values defined than these 8 location reference values then a proper mapping needs to be done or less important classes needs to be ignored.

TABLE A2

Logical format: Functional road class
FRC

FRC 0 - Main road
FRC 1 - First class road
FRC 2 - Second class road
FRC 3 - Third class road
FRC 4 - Fourth class road
FRC 5 - Fifth class road
FRC 6 - Sixth class road
FRC 7 - Other class road Abbreviation: FRC Type: integer

1.1.3.3 Form of Way

The form of way (FOW) describes the physical road type. The possible values of the FOW attribute are shown in Table A3.

TABLE A3

Logical Format: Form of way

| FOW | Description |
|---|---|
| UNDEFINED | The physical road type is unknown. |
| MOTORWAY | A Motorway is defined as a road permitted for motorized vehicles only in combination with a prescribed minimum speed. It has two or more physically separated carriageways and no single level-crossings. |
| MULTIPLE_CAR-RIAGEWAY | A multiple carriageway is defined as a road with physically separated carriageways regardless of the number of lanes. If a road is also a motorway, it should be coded as such and not as a multiple carriageway. |
| SINGLE_CAR-RIAGEWAY | All roads without separate carriageways are considered as roads with a single carriageway. |
| ROUNDABOUT | A Roundabout is a road which forms a ring on which traffic travelling in only one direction is allowed. |
| TRAFFICSQUARE | A Traffic Square is an open area (partly) enclosed by roads which is used for non-traffic purposes and which is not a Roundabout. |
| SLIPROAD | A Slip Road is a road especially designed to enter or leave a line. |
| OTHER | The physical road type is known but does not fit into one of the other categories. |

Abbreviation: FOW Type: integer

1.1.3.4 Bearing

The bearing (BEAR) describes the angle between the true North and a line which is defined by the coordinate of the LRP and a coordinate which is BEARDIST along the line defined by the LRP attributes. If the line length is less than BEARDIST then the opposite point of the line is used (regardless of BEARDIST). The bearing is measured in degrees and always positive (measuring clockwise from North). The parameter BEARDIST is defined in Table A4.

Abbreviation: BEAR Type: integer

TABLE A4

Logical format: Parameter BEARDIST

| Abbreviation | Description | Value | Unit |
|---|---|---|---|
| BEARDIST | distance between two coordinates which form a line for the calculation of the bearing value | 20 | metres |

Figure 13:
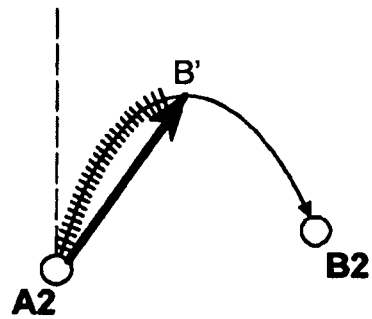
FIG. 13 illustrates how a bearing is calculated for one LRP as regards a following LRP.

FIG. 13 shows how the second point for the bearing calculation is determined. The figure shows a line from A2 to B2 which is longer than BEARDIST. The shaded part of this line is exactly BEARDIST meters long so that the point marked with B' is BEARDIST meters away from A2 traversing along the line from A2 to B2. The straight line from A2 to B' is now considered for the calculation of the bearing value. Note, this is different to the angle that would have been calculated if the opposite node of line (in this case, this would be B2) is used.

Figure 14:
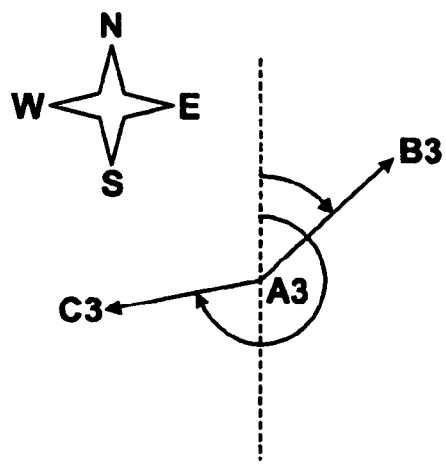
FIG. 14 shows how bearings can vary, FIG. 15 demonstrates how a "distance to next point" attribute is determined for a LRP.

FIG. 14 shows two examples of the bearing value calculation. There are two lines, one from A3 to B3 and one from A3 to C3. For both lines the arcs indicate the angles to the North.

1.1.3.5 Distance to Next LRP

This DNP field describes the distance to the next LRP in the topological connection of the LRPs. The distance is measured in meters and is calculated along the location reference path. The last LRP will have the distance value 0.

Abbreviation: DNP Type: integer

Figure 15:
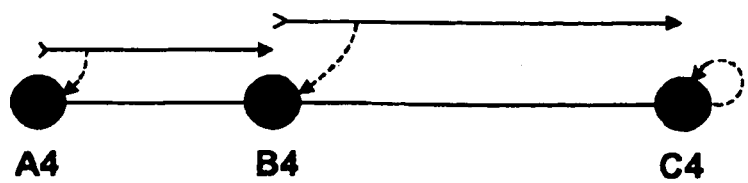

FIG. 15 shows an example of the distance calculation and assignment. The three LRPs are in a sequence from A4 over B4 to C4. Therefore the distance between A4 and B4 along the location reference path will be assigned to A4. The LRP B4 will hold the distance between B4 and C4 and the LRP C4 will have a distance value of 0.

1.1.3.6 Lowest FRC to Next LRP

The lowest FRC (LFRCNP) is the lowest FRC value which appears in the location reference path between two consecutive LRPs. The highest FRC value is 0 and the lowest possible FRC value is valued with 7.

Abbreviation: LFRCNP Type: integer

1.1.4. Offsets

Offsets are used to shorten the location reference path at its start and end. The new positions along the location reference path indicate the real start and end of the location.

1.1.4.1 Positive Offset

Figure 16:
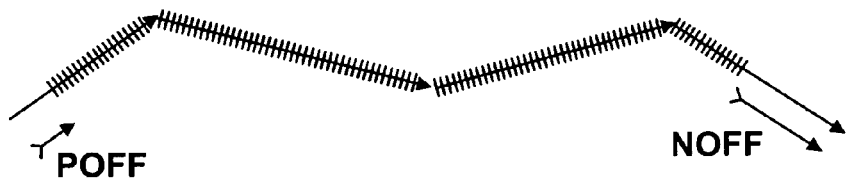
FIG. 16 illustrates the use of offsets.

The positive offset (POFF) is the difference of the start point of the location reference and the start point of the desired location along the location reference path. The value is measured in meters. FIG. 16 shows an example for the calculation of the positive and negative offset. The lines are indicating the location reference path and the hatching indicates the desired location.

Abbreviation: POFF Type: integer

1.1.4.2 Negative Offset

The negative offset (NOFF) is the difference of the end point of the desired location and the end point of the location reference along the location reference path. The value is measured in meters. (see FIG. 16 also).

Abbreviation: NOFF Type: integer

1.2 Relationship Attributes-LRP

All attributes are linked to a LRP. For all LRPs (except that last LRP) the attributes describe an outgoing line of the node at the LRP coordinate. The attributes of the last LRP direct to an incoming of the node at the LRP coordinate.

Figure 17:
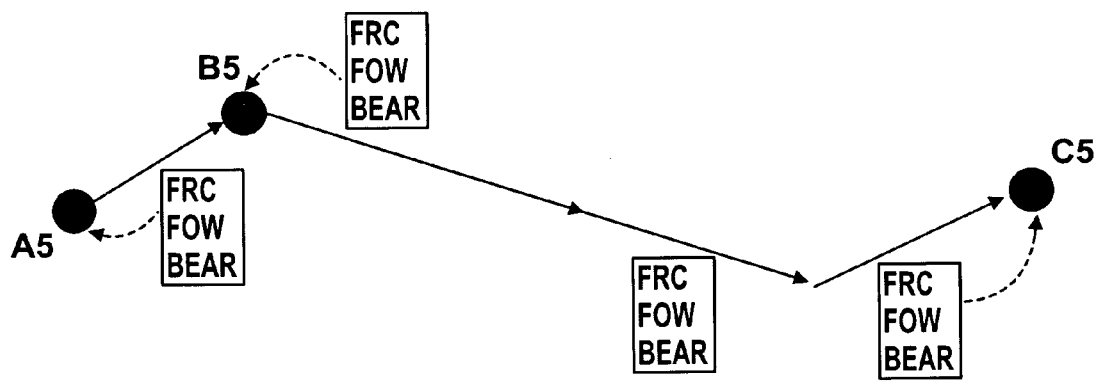
FIG. 17 shows the manner in which LRPs are provided with attributes, FIGS. 18/19 illustrates nodes to be avoided during the encoding of a location reference.

FIG. 17 shows an example for the relationship between a LRP and the attributes. The lines indicate the location reference path and the nodes A5, B5 and C5 are the LRPs. Note that there is also a line whose start and end node is not a LRP (the third line in the sequence). This line does not need to be referenced because it is covered by the shortest path between the LRPs B5 and C5.

The LRPs A5 and B5 direct to an outgoing line and the last LRP C5 directs to an incoming line.

1.3 Data Format Rules

These rules describe additional regulations for location references according to this specification. These rules are used to simplify the encoding and decoding process and to increase the accuracy of the results.

Rule-1 The maximum distance between two location reference points shall not exceed 15 km. The distance is measured along the location reference path. If this condition is not fulfilled for a location reference then a sufficient number of additional LRPs shall be inserted.

The maximum distance between two consecutive location reference points is restricted in order to speed up shortest-path computation because several short routes can be computed quicker than one large route if the routing algorithm has to take the whole network into account. The restriction also provides the opportunity to from a compact binary format with an acceptable accuracy.

Rule-2 All lengths are integer values. If there are float values available then we will round these values to get an integer representation.

Different maps might store the length values in different formats and also with different precision and the uniform basis for all is the usage of integer values. It is also more compact to transmit integer values in a binary format than using float values.

Rule-3 Two LRPs are mandatory and the number of intermediate LRPs is not limited.

A line location reference must always have at least two location reference points indicating the start and the end of the location. If the encoder detects critical situations where the decoder (on a different map) might get into trouble, the location reference might be enhanced with additional intermediate LRPs.

Rule-4 The coordinates of the LRPs shall be chosen on real network nodes.

These real network nodes shall be junctions in the real world and it is expected that these junctions can be found in different maps with a higher probability than positions somewhere on a line. Additionally nodes shall be avoided which can be easily skipped during a route search. At these avoidable nodes it is not possible to deviate from a route.

Figure 18:
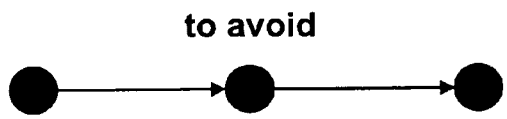
Figure 19:

Nodes having only one incoming and one outgoing line shall be avoided since these nodes are not related to junctions (see FIG. 18) and can be stepped over during route search. Nodes which have two incoming and two outgoing lines and there are only two adjacent nodes shall also be avoided (see FIG. 19).

If one of these nodes is selected for a LRP then this LRP should be shifted along the location reference path in order to find a suitable node. This can be done since a route calculation will step over such avoidable nodes without leaving the desired path.

If the start or the end of a location is placed on avoidable nodes then the encoder should expand the location uniquely and should find a suitable node outside of the location. This expansion must never go into the location because this will shorten the location.

1.3.1. Overview of the Data Format Rules

The following Table summarizes the data format rules.

TABLE A5

Data format rules overview

| Rule | Description | Value |
|---|---|---|
| Rule 1 | max distance between two consecutive LRPs | 15000 m |
| Rule 2 | road length values | treated as integer values |
| Rule 3 | number of LRPs | at least two LRPs |
| Rule 4 | avoidable nodes | LRPs shall be placed on real network nodes (also valid for start and end of a location) |

1.4 Binary Representation

The physical data format describes a byte-oriented stream format for the logical data format specified above. It uses the components described in the logical data format in section 1.1.

1.4.1. Data Types

The physical data format uses the following data types. Table gives an overview of all available data types and specifies the name, the type and the designated size of each data type. In the following sections the data type names are used to indicate the size and type for each data component.

TABLE A6

Physical format: Data types

| Data type name | Type | Size | Range |
|---|---|---|---|
| Boolean | flag with true = 1, false = 0 | 1 bit | 0-1 |
| uByte | unsigned integer | 1 byte | 0-255 |
| uShort | unsigned integer | 2 bytes | 0-65535 |
| uSmallInt | unsigned integer | 3 bytes | 0-16777215 |
| uInteger | unsigned integer | 4 bytes | 0-4294967295 |
| sByte | signed integer | 1 byte | −128-127 |
| sShort | signed integer | 2 bytes | −32768-32767 |
| sSmallInt | signed integer | 3 bytes | −8388608-8388607 |
| sInteger | signed integer | 4 bytes | −2147483648-2147483647 |
| String[n] | array of n characters | n bytes | variable size |
| BitField[n] | array of n bits | n bits | variable size |

Negative integer values are stored in the two's complement format.

1.4.2. Coordinates (COORD)

Each point in a map consists of a coordinate pair "longitude" (lon) and "latitude" (lat) represented in WGS84 coordinates. The directions north and east are represented by positive values (longitude and latitude respectively). The lon and lat values are stored in a decamicrodegrees resolution ($10^{-5}$, five decimals).

The coordinate values will be transmitted as integer values. These values will be generated using Equation E1 which calculates a 24-bit integer representation. The resolution parameter is set to 24. This translation leads to an error of about 2.4 meter at most. The backward translation is described in Equation E2. Both equations make use of the signum function which is −1 for negative values, 1 for positive values and 0 otherwise.

Transformation from decimal coordinates into integer values $$\text{int} = \left(\text{sgn}(deg) * 0.5 + \frac{deg * 2^{Resolution}}{360°}\right)$$    Equation E1

Transformation from integer values into decimal coordinates $$deg = \left(\frac{(\text{int} - \text{sgn}(\text{int}) * 0.5) * 360°}{2^{Resolution}}\right)$$    Equation E2

The physical format makes use of an absolute and a relative coordinate format. The absolute format represents the designated values of the geographical position and the relative value is the offset the coordinates relative to the preceding coordinate.

1.4.2.1 Absolute Format

The absolute format describes geographical position in a 24-bit resolution. Table A7 shows the data type used for the absolute format.

TABLE A7

Physical format: Coordinate format (absolute)

| Data type | Value | Description |
| --- | --- | --- |
| sSmallInt | −8388608-+8388607 | 24 bit representation |

1.4.2.2 Relative Format

The relative format is used to describe differences between two consecutive coordinates. The difference is calculated for each value (lon/lat) separately as shown in Equation E3. The current and previous values represent the latitude (longitude) value in degrees. The difference between these two values is multiplied with 100000 in order to resolve an integer value.

relative=round(100000*(currentPoint−previousPoint))

Equation E3: Relative Coordinates Calculation

Table A8 shows the maximum distances which are possible using a 16-bit representation. The figures are calculated for a fixed coordinate at lon=5° and lat=52° (location in the Netherlands).

TABLE A8

Physical format: Longitude/Latitude ranges for relative coordinates

| byte | latitude | | longitude | |
| --- | --- | --- | --- | --- |
| | lower bound | upper bound | lower bound | upper bound |
| 2 | −36459 m | 36460 m | −22504 m | 22504 m |

Table A9 shows the data type for 2 bytes offsets.

TABLE A9

Physical format: Coordinate format (relative)

| Data type | Value | Description |
| --- | --- | --- |
| sShort | −32768-+32767 | 2 bytes relative coordinates |

1.4.3. Attribute Values

The binary format of the attributes will follow in this section.

1.4.3.1 Functional Road Class (FRC)

The functional road class (FRC) can hold eight different values as described in the logical format. These eight values are represented by 3 bits and the mapping is shown in Table A10.

TABLE A10

Physical format: Functional road class

| Data type | Value (integer) | Value (binary) | Description |
| --- | --- | --- | --- |
| BitField[3] | 0 | 000 | FRC 0 - Main road |
| | 1 | 001 | FRC 1 - First class road |
| | 2 | 010 | FRC 2 - Second class road |
| | 3 | 011 | FRC 3 - Third class road |
| | 4 | 100 | FRC 4 - Fourth class road |
| | 5 | 101 | FRC 5 - Fifth class road |
| | 6 | 110 | FRC 6 - Sixth class road |
| | 7 | 111 | FRC 7 - Other class road |

1.4.3.2 Form of Way (FOW)

The form of way (FOW) can hold eight different values as described in the logical format. These eight values are represented by 3 bits and the mapping is shown in TableA11.

TABLE A11

Physical format: Form of way

| Data type | Value (integer) | Value (binary) | Description |
| --- | --- | --- | --- |
| BitField[3] | 0 | 000 | UNDEFINED |
| | 1 | 001 | MOTORWAY |
| | 2 | 010 | MULTIPLE_CARRIAGEWAY |
| | 3 | 011 | SINGLE_CARRIAGEWAY |
| | 4 | 100 | ROUNDABOUT |
| | 5 | 101 | TRAFFICSQUARE |
| | 6 | 110 | SLIPROAD |
| | 7 | 111 | OTHER |

1.4.3.3 Bearing (BEAR)

The bearing describes the angle between the road and the true North as described in the logical format. The physical data format defines 32 sectors whereby each sector covers 11.25° of the circle. These 32 sectors are represented by 5 bits. Table A12 shows the data type for the bearing attribute and Table A13 shows the mapping from the sectors to the concrete value.

TABLE A12

Physical format: Bearing

| Data type | Value | Description |
|---|---|---|
| BitField[5] | 0-31 | number of the sector in which the angle between the North and the line specified in the logical data format is located; the full circle is divided into 32 sectors each covering an angle of 11.25°. |

TABLE A13

Physical format: Bearing value definition

| Value | Sector | Value | Sector |
|---|---|---|---|
| 0 | 000.00° <= x < 011.25° | 16 | 180.00° <= x < 191.25° |
| 1 | 011.25° <= x < 022.50° | 17 | 191.25° <= x < 202.50° |
| 2 | 022.50° <= x < 033.75° | 18 | 202.50° <= x < 213.75° |
| 3 | 033.75° <= x < 045.00° | 19 | 213.75° <= x < 225.00° |
| 4 | 045.00° <= x < 056.25° | 20 | 225.00° <= x < 236.25° |
| 5 | 056.25° <= x < 067.50° | 21 | 236.25° <= x < 247.50° |
| 6 | 067.50° <= x < 078.75° | 22 | 247.50° <= x < 258.75° |
| 7 | 078.75° <= x < 090.00° | 23 | 258.75° <= x < 270.00° |
| 8 | 090.00° <= x < 101.25° | 24 | 270.00° <= x < 281.25° |
| 9 | 101.25° <= x < 112.50° | 25 | 281.25° <= x < 292.50° |
| 10 | 112.50° <= x < 123.75° | 26 | 292.50° <= x < 303.75° |
| 11 | 123.75° <= x < 135.00° | 27 | 303.75° <= x < 315.00° |
| 12 | 135.00° <= x < 146.25° | 28 | 315.00° <= x < 326.25° |
| 13 | 146.25° <= x < 157.50° | 29 | 326.25° <= x < 337.50° |
| 14 | 157.50° <= x < 168.75° | 30 | 337.50° <= x < 348.75° |
| 15 | 168.75° <= x < 180.00° | 31 | 348.75° <= x < 360.00° |

Figure 20:
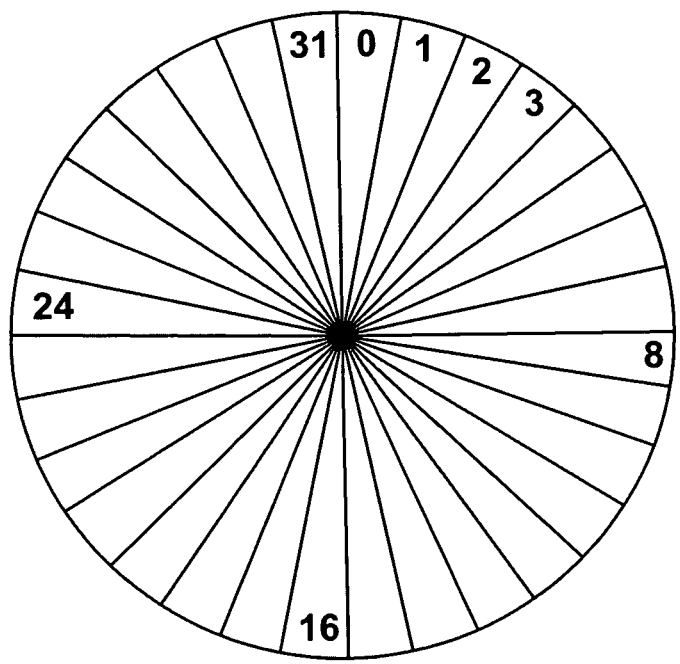
FIG. 20 illustrates how bearing values for a LRP fall within 1 of 32 discrete sectors of a circle.

Equation E4 outlines the calculation of the bearing value and FIG. 20 provides a graphical overview of the sectors.

Calculation of the bearing value $$value = \left\lfloor \frac{angle}{11.25°} \right\rfloor, \quad 0° \leq angle < 360° \qquad \text{Equation E4}$$

1.4.3.4 Distance to Next LRP (DNP)

The DNP attribute measures the distance between two consecutive LRPs along the location reference path as described in the logical format.

The physical data format defines an 8-bit representation and Table A14 shows the data type used for DNP. This representation defines 255 intervals and in combination with rule 1 of the data format rules (maximum length between two consecutive LRPs is limited by 15000 m) each interval will have a length of 58.6 meters.

TABLE A14

Physical format: Distance to next point

| Data type | Value | Description |
|---|---|---|
| BitField[5] | 0-255 | distance interval according to Equation E5 |

Equation E5 shows how the DNP values can be calculated.

Calculation of the *DNP* value $$value = \left\lfloor \frac{length}{58.6 \text{ m}} \right\rfloor \qquad \text{Equation E5}$$

1.4.3.5 Lowest FRC to Next Point (LFRCNP)

The lowest FRC to the next point indicates the lowest functional road class used in the location reference path to the next LRP. This information could be used to limit the number of road classes which need to be scanned during the decoding. See Table A15 for a definition of the data type.

TABLE A15

Physical format: Lowest FRC to next point

| Data type | Value | Description |
|---|---|---|
| BitField[3] | 0-7 | holds the same values as described in Table |

1.4.4. Location Reference Header

The Location Reference header contains general information about the reference.

1.4.4.1 Version (VER)

The version is used to distinguish between several physical and data formats for location references. The version number is represented by 3 bits and the data type is shown in Table A16.

TABLE A16

Physical format: Version

| Data type | Value | Description |
|---|---|---|
| BitField[3] | 0-7 | current version number |

1.4.4.2 Attribute Flag (AF)

The attribute flag indicates whether there are attributes appended to each LRP or not. The AF value is 0 if no attributes are appended and therefore the location reference only consists of coordinates. Otherwise a value of 1 indicates that attributes are appended to each LRP. The data type for the AF is shown in Tables A17 and A18.

TABLE A17

Physical format: Attribute flag

| Data type | Value | Description |
|---|---|---|
| Boolean | 0, 1 | flag, indicating whether attributes are appended to each LRP or not |

TABLE A18

Physical format: Attribute flag values

| Value | Description |
|---|---|
| 0 | no attributes are appended |
| 1 | for each LRP a set of attributes is appended |

1.4.4.3 Area Flag (ArF)

The area flag indicates whether the location reference describes an area or not. If this flag is set then the location shall be connected and we describe an area, as seen in Tables A19 and A20 below.

TABLE A19

Physical format: Area flag

| Data type | Value | Description |
|---|---|---|
| Boolean | 0, 1 | flag, indicating whether the location reference describes an area or not |

TABLE A20

Physical format: Area flag values

| Value | Description |
|---|---|
| 0 | location reference describes no area |
| 1 | location reference describes an area |

1.4.5. Offsets

Offsets are used to locate the start and end of a location more precise than bound to the nodes in a network. The logical format defines two offsets, one at the start of the location and one at the end of the location and both offsets operate along the lines of the location and are measured in meters. The offset values are not mandatory and a missing offset value means an offset of 0 meters. Offsets are also only valid for line locations which have attributes included.

1.4.5.1 Offset Flags

Offset flags indicate whether the data includes a specific offset information or not. The physical data format deals with two flags corresponding to the two different offset values. The positive offset flag (PoffF) and the negative offset flag (NoffF) are described in Tables A21 and A22.

TABLE A21

Physical format: Offset flag

| Data type | Value | Description |
|---|---|---|
| Boolean | 0, 1 | flag, indicating whether the corresponding offset value is included in the data or not |

TABLE A22

Physical format: Offset flag values

| Value | Description |
|---|---|
| 0 | location reference data does NOT include the corresponding offset information |
| 1 | location reference data includes the corresponding offset information |

1.4.5.2 Offset Values

The offset values (positive and negative, POFF and NOFF) indicate the distance between the start (end) of the location reference path and the "real" start (end) of the location.

The physical data format defines an 8-bit representation for each offset value. Table A23 shows the data type used for POFF and NOFF. This representation allows us to define 256 intervals with a length of each interval of 58.6 meters. The interval number calculation for offsets is outlined in Equation E6.

TABLE A23

Physical format: Offset

| Data type | Value | Description |
|---|---|---|
| BitField[5] | 0-255 | offset length interval according to Equation E6 |

Calculation of offset values $$\text{value} = \left\lfloor \frac{\text{offset length}}{58.6 \text{ m}} \right\rfloor \quad \text{Equation E6}$$

1.5 Physical Data Format Specification

This section describes the arrangement of the data fields in a byte stream. It is assumed that we have a byte-oriented stream and we can use 8 bits per byte.

1.5.1. Overview

The main structure of the binary format is:

Header, First LRP, following LRPs, Last LRP, and offsets

The Header, the first LRP and the last LRP are mandatory and the number of following LRPs is not limited. The Last LRP has its own structure due to a different information level. Offsets are optional and the existence will be indicated by flags in the attributes of the last LRP.

Table A24 gives an overview of the main structure. The stream can be read from the left to the right, so that the first received byte will be the status byte. For each coordinate the first received value will be the longitude value followed by the latitude value.

The calculation of message sizes depending on the number of LRPs can be found in section 1.6 below.

| Structure | Header | First LRP | | | | | following LRP | | | | | |
|---|---|---|---|---|---|---|---|---|---|---|---|---|
| Name | Status | absolute Longitude | absolute Latitude | attr. 1 | attr. 2 | attr. 3 | relative Longitude | relative Latitude | attr. 1 | attr. 2 | attr. 3 | ... |
| # bytes | 1 | 3 | 3 | 1 | 1 | 1 | 2 | 2 | 1 | 1 | 1 | ... |
| description | section 1.5.2 | section 1.5.3 | section 1.5.3 | section 1.5.5.1 | section 1.5.5.2 | section 1.5.5.3 | section 1.5.4 | section 1.5.4 | section 1.5.5.1 | section 1.5.5.2 | section 1.5.5.3 | ... |

TABLE A24

| Binary format overview | | | | | | |
|---|---|---|---|---|---|---|
| Structure | ... | last LRP | | | positive offset | negative offset |
| Name | ... relative Longitude | relative Latitude | attr. 1 | attr. 4 | offset | offset |
| # bytes | ... 2 | 2 | 1 | 1 | 1 | 1 |
| description | ... section 1.5.3 | section 1.5.3 | section 1.5.5.1 | section 1.5.5.4 | section 1.5.6 | section 1.5.6 |

1.5.2. Status Byte

The status byte is transmitted once for every location reference and contains the area flag (ArF, section 1.4.4.3), attribute flag (AF, section 1.4.4.2) and the version information (VER, section 1.4.4.1). The bits 7, 6 and 5 are reserved for future use (RFU) and shall be 0. Table A25 gives an overview of the usage of each bit in the status byte.

TABLE A25

| Status byte | | | | | | | | |
|---|---|---|---|---|---|---|---|---|
| Bit | 7 | 6 | 5 | 4 | 3 | 2 | 1 | 0 |
| used for | RFU | RFU | RFU | Arf | AF | VER | | |

In this particular version of the format, attributes are added to each LRP and areas are not described. If the "current version" is 2, the status byte will have the value shown in Table A26:

TABLE A26

| Status byte value | | | | | | | | |
|---|---|---|---|---|---|---|---|---|
| Bit | 7 | 6 | 5 | 4 | 3 | 2 | 1 | 0 |
| value | 0 | 0 | 0 | 0 | 1 | 010 | | |

1.5.3. First LRP Coordinates

The coordinates of the first LRP are transmitted in an absolute format (see section 1.4.2.1) and therefore each value (lon and lat) will use 3 bytes. Table A27 shows the byte order for longitude and latitude values.

TABLE A27

| First LRP coordinates | | | | | | | | | | | | | | | | | | | | | | | | |
|---|---|---|---|---|---|---|---|---|---|---|---|---|---|---|---|---|---|---|---|---|---|---|---|---|
| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| used for | highest byte | | | | | | | | middle byte | | | | | | | | lowest byte | | | | | | | |

1.5.4. Following LRP Coordinates

The coordinates of the following LRPs and the last LRP are transmitted in a relative format (see section 1.4.2.2) and therefore each value (lon and lat) will use 2 bytes. Table A28 shows the byte order for longitude and latitude values.

TABLE A28

| Following LRPs coordinates | | | | | | | | | | | | | | | | |
|---|---|---|---|---|---|---|---|---|---|---|---|---|---|---|---|---|
| Bit | 15 | 14 | 13 | 12 | 11 | 10 | 9 | 8 | 7 | 6 | 5 | 4 | 3 | 2 | 1 | 0 |
| used for | highest byte | | | | | | | | lowest byte | | | | | | | |

1.5.5. Attributes

Attributes are added to each LRP. There are 4 different types of attributes depending on the position of a LRP in the location reference.

1.5.5.1 First Attribute Byte (Attr. 1)

The first attribute byte contains the attributes FRC (see section 1.4.3.1) and FOW (see section 1.4.3.2) and two bits are reserved for future use. Table A29 shows the usage of each bit.

TABLE A29

| First attribute byte - valid for all LRPs | | | | | | | | |
|---|---|---|---|---|---|---|---|---|
| Bit | 7 | 6 | 5 | 4 | 3 | 2 | 1 | 0 |
| used for | RFU | RFU | FRC | | | FOW | | |

1.5.5.2 Second Attribute Byte (Attr. 2)

The second attribute byte contains the attributes LFRCNP (see section 1.4.3.5) and BEAR (see section 1.4.3.3). Table A30 shows the usage of each bit. This attribute is not valid for the last LRP since there is no LFRCNP information available.

TABLE A30

| Second attribute byte - valid for all LRPs, except the last LRP | | | | | | | | |
|---|---|---|---|---|---|---|---|---|
| Bit | 7 | 6 | 5 | 4 | 3 | 2 | 1 | 0 |
| used for | LFRCNP | | | BEAR | | | | |

1.5.5.3 Third Attributes Byte (Attr. 3)

The third attribute byte contains the attribute DNP (see section 1.4.3.4) as shown in Table A31. This attribute is not valid for the last LRP since there is no DNP information available.

TABLE A31

| Third attribute byte - valid for all LRPs, except the last LRP | | | | | | | | |
|---|---|---|---|---|---|---|---|---|
| Bit | 7 | 6 | 5 | 4 | 3 | 2 | 1 | 0 |
| used for | | | | DNP | | | | |

1.5.5.4 Fourth Attribute Byte (Attr. 4)

The attribute 4 contains the BEAR information, the positive and negative offset flags (see section 1.4.5.1) and one bit is reserved for future use. This attribute is used for the last LRP, as shown in Table A32.

TABLE A32

| Fourth attribute bytes - valid only for the last LRP | | | | | | | | |
|---|---|---|---|---|---|---|---|---|
| Bit | 7 | 6 | 5 | 4 | 3 | 2 | 1 | 0 |
| used for | RFU | POffF | NOffF | | BEAR | | | |

1.5.6. Offset

The positive offset (POFF) and negative offset (NOFF) are only included if the corresponding flags in attribute 4 indicate their existence. Absent offset values indicate an offset of 0 meters. The offset values are calculated according to section 1.4.5., and bit usage for these offsets is shown in Tables A33, A34.

TABLE A33

| Positive offset value | | | | | | | | |
|---|---|---|---|---|---|---|---|---|
| Bit | 7 | 6 | 5 | 4 | 3 | 2 | 1 | 0 |
| used for | | | | POFF | | | | |

TABLE A34

| Negative offset value | | | | | | | | |
|---|---|---|---|---|---|---|---|---|
| Bit | 7 | 6 | 5 | 4 | 3 | 2 | 1 | 0 |
| used for | | | | NOFF | | | | |

1.6 Message Size Calculation

The message size of a location reference depends on the number of LRPs included in the location reference. There must be at least two LRPs in the location reference. Also mandatory is the header with the status information. The following calculation and Table A35 show message sizes depending on the number of LRPs.

Header
      1 byte status
      Total: 1 byte
   First LRP
      6 bytes COORD (3 bytes each for lon/lat)
      3 bytes Attributes
      Total: 9 bytes
   Following LRPs
      4 bytes COORD (2 bytes each for lon/lat)
      3 bytes Attributes
      Total: 7 bytes
   Last LRP
      4 bytes COORD (2 bytes each for lon/lat)
      2 bytes Attributes
      Total: 6 bytes
   Offset (if included)
      1 byte positive offset (if included)
      1 byte negative offset (if included)
      Total: 0-2 bytes

TABLE A35

| Message sizes depending on the number of LRPs | |
|---|---|
| # LRPs | Message size |
| 2 | 16 bytes |
| | (+1 or +2 bytes offset, if included) |
| 3 | 23 bytes |
| | (+1 or +2 bytes offset, if included) |
| 4 | 30 bytes |
| | (+1 or +2 bytes offset, if included) |
| 5 | 37 bytes |
| | (+1 or +2 bytes offset, if included) |
| 6 | 44 bytes |
| | (+1 or +2 bytes offset, if included) |
| 7 | 51 bytes |
| | (+1 or +2 bytes offset, if included) |
| 8 | 58 bytes |
| | (+1 or +2 bytes offset, if included) |
| ... | ... |
| n (n > 1) | $1 + 9 + (n - 2)*7 + 6$ bytes |
| | (+1 or +2 bytes offset, if included) |

A specific example of the manner in which the above formats are used is now provided with reference to the location reference described above with reference to FIGS. 2, 3, 4 and 5 in which three location reference points (nodes ▫, ▫ and ▫ and lines ▫-▫, ▫-▫ and ▫-▫) are identified as precisely describing a location.

The location reference consists of three location reference points and Table A36 below shows the coordinates for the nodes ▫, ▫ and ▫. These nodes are the corresponding nodes to the location reference points. In preparation of the binary format this table also shows the relative coordinates. The node ▫ corresponds to the location reference point 1 and will have coordinates in absolute format. Node ▫ corresponding to location reference point 2 will have relative coordinates to the location reference point 1. Node ▫ corresponding to location reference point 2 will also have relative coordinates but now referencing to location reference point 2.

TABLE A36

| Example coordinates | | | | | |
|---|---|---|---|---|---|
| Node ID | LRP index | Longitude | Latitude | Relative longitude | Relative latitude |
| ▫ | 1 | 6.12683° | 49.60851° | — | — |
| ▫ | 2 | 6.12838° | 49.60398° | 155 | −453 |
| ▫ | 3 | 6.12817° | 49.60305° | −21 | −93 |

The relative longitude and latitude are calculated according Equation E3 above. The offsets being calculated in step 2 of the encoding process are shown in Table A37. In the binary data only the positive offset will appear because the negative offset is 0 and a missing offset will be treated as 0.

TABLE A37

| Example offset values | |
|---|---|
| Field | Value |
| positive Offset | 150 |
| negative Offset | 0 |

Table A38 below collects the relevant data for each location reference point from the underlying digital map, and through calculation. This includes the functional road class, the form of way and the bearing of the corresponding line. The needed information about the path between two subsequent location reference points is also shown (lowest functional road class and distance to the next location reference point).

TABLE A38

| | Location reference points determined during encoding | | | | |
|---|---|---|---|---|---|
| LRP index | FRC | FOW | BEAR | LFRCNP | DNP |
| 1 | FRC3 | MULTIPLE_CARRIAGEWAY | 135° | FRC3 | 561 |
| 2 | FRC3 | SINGLE_CARRIAGEWAY | 227° | FRC5 | 274 |
| 3 | FRC5 | SINGLE_CARRIAGEWAY | 290° | — | — |

The BEAR, LFRCNP and DNP attributes are determined as described above:

The following tables above hold all relevant information for creating the binary data. The following tables outline the binary data according to the Physical Data Format:

| | |
|---|---|
| Status byte: | see Table A39 |
| LRP 1: | see Table A40 to Table A44 |
| LRP 2 | see Table A45 to Table A49 |
| LRP 3 | see Table A50 to Table A53 |
| Offset | see Table A54 |

TABLE A39

| | Binary example: status byte | | | | | | | |
|---|---|---|---|---|---|---|---|---|
| Bit | 7 | 6 | 5 | 4 | 3 | 2 | 1 | 0 |
| Description | RFU | RFU | RFU | ArF | AF | Version | | |
| Value | 0 | 0 | 0 | 0 | 1 | 0 | 1 | 0 |

TABLE A40

| | Binary example: LRP 1 - absolute longitude | | | | | | | | | | | | | | | | | | | | | | |
|---|---|---|---|---|---|---|---|---|---|---|---|---|---|---|---|---|---|---|---|---|---|---|---|
| | Byte | | | | | | | | | | | | | | | | | | | | | | |
| | First | | | | | | | | Second | | | | | | | | Third | | | | | | |
| Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Value | 0 | 0 | 0 | 0 | 0 | 1 | 0 | 0 | 0 | 1 | 0 | 1 | 1 | 0 | 1 | 1 | 0 | 1 | 0 | 1 | 1 | 0 | 1 | 1 |

TABLE A41

| | Binary example: LRP1 -absolute latitude | | | | | | | | | | | | | | | | | | | | | | |
|---|---|---|---|---|---|---|---|---|---|---|---|---|---|---|---|---|---|---|---|---|---|---|---|
| | Byte | | | | | | | | | | | | | | | | | | | | | | |
| | First | | | | | | | | Second | | | | | | | | Third | | | | | | |
| Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Value | 0 | 0 | 1 | 0 | 0 | 0 | 1 | 1 | 0 | 1 | 0 | 0 | 0 | 1 | 1 | 0 | 1 | 1 | 1 | 0 | 1 | 0 | 0 | 0 |

TABLE A42

| | Binary example: LRP1 - attribute 1 | | | | | | | |
|---|---|---|---|---|---|---|---|---|
| Bit | 7 | 6 | 5 | 4 | 3 | 2 | 1 | 0 |
| Description | RFU | RFU | FRC | | | FOW | | |
| Value | 0 | 0 | 0 | 1 | 1 | 0 | 1 | 0 |

TABLE A43

| | Binary example: LRP1 - attribute 2 | | | | | | | |
|---|---|---|---|---|---|---|---|---|
| Bit | 7 | 6 | 5 | 4 | 3 | 2 | 1 | 0 |
| Description | LFRCNP | | | Bearing | | | | |
| Value | 0 | 1 | 1 | 0 | 1 | 1 | 0 | 0 |

TABLE A44

| | Binary example: LRP1 - attribute 3 | | | | | | | |
|---|---|---|---|---|---|---|---|---|
| Bit | 7 | 6 | 5 | 4 | 3 | 2 | 1 | 0 |
| Description | DNP | | | | | | | |
| Value | 0 | 0 | 0 | 0 | 1 | 0 | 0 | 1 |

TABLE A45

Binary example: LRP2 - relative longitude

| | Byte | | | | | | | | | | | | | | | |
|---|---|---|---|---|---|---|---|---|---|---|---|---|---|---|---|---|
| | First | | | | | | | | Second | | | | | | | |
| Bit | 7 | 6 | 5 | 4 | 3 | 2 | 1 | 0 | 7 | 6 | 5 | 4 | 3 | 2 | 1 | 0 |
| Value | 0 | 0 | 0 | 0 | 0 | 0 | 0 | 0 | 1 | 0 | 0 | 1 | 1 | 0 | 1 | 1 |

TABLE A46

Binary example: LRP2 - relative latitude

| | Byte | | | | | | | | | | | | | | | |
|---|---|---|---|---|---|---|---|---|---|---|---|---|---|---|---|---|
| | First | | | | | | | | Second | | | | | | | |
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 0 | 0 | 1 | 1 | 1 | 0 | 1 | 1 | |

TABLE A47

Binary example: LRP2 - attribute 1

| Bit | 7 | 6 | 5 | 4 | 3 | 2 | 1 | 0 |
|---|---|---|---|---|---|---|---|---|
| Description | RFU | RFU | FRC | | | FOW | | |
| Value | 0 | 0 | 0 | 1 | 1 | 0 | 1 | 1 |

TABLE A48

Binary example: LRP2 - attribute 2

| Bit | 7 | 6 | 5 | 4 | 3 | 2 | 1 | 0 |
|---|---|---|---|---|---|---|---|---|
| Description | LFRCNP | | | | Bearing | | | |
| Value | 1 | 0 | 1 | 1 | 0 | 1 | 0 | 0 |

TABLE A49

Binary example: LRP2 - attribute 3

| Bit | 7 | 6 | 5 | 4 | 3 | 2 | 1 | 0 |
|---|---|---|---|---|---|---|---|---|
| Description | DNP | | | | | | | |
| Value | 0 | 0 | 0 | 0 | 0 | 1 | 0 | 0 |

TABLE A50

Binary example: LRP3 - relative longitude

| | Byte | | | | | | | | | | | | | | | |
|---|---|---|---|---|---|---|---|---|---|---|---|---|---|---|---|---|
| | First | | | | | | | | Second | | | | | | | |
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 1 | 1 | 0 | 1 | 0 | 1 | 1 | | |

TABLE A51

Binary example: LRP3 - relative latitude

| | Byte | | | | | | | | | | | | | | |
|---|---|---|---|---|---|---|---|---|---|---|---|---|---|---|---|
| | First | | | | | | | | Second | | | | | | |
| Bit | 7 | 6 | 5 | 4 | 3 | 2 | 1 | 0 | 7 | 6 | 5 | 4 | 3 | 2 | 1 | 0 |
| Value | 1 | 1 | 1 | 1 | 1 | 1 | 1 | 1 | 1 | 0 | 1 | 0 | 0 | 0 | 1 | 1 |

TABLE A52

Binary example: LRP3 - attribute 1

| Bit | 7 | 6 | 5 | 4 | 3 | 2 | 1 | 0 |
|---|---|---|---|---|---|---|---|---|
| Description | RFU | RFU | FRC | | | FOW | | |
| Value | 0 | 0 | 1 | 0 | 1 | 0 | 1 | 1 |

TABLE A53

Binary example: LRP3 - attribute 4

| Bit | 7 | 6 | 5 | 4 | 3 | 2 | 1 | 0 |
|---|---|---|---|---|---|---|---|---|
| Description | RFU | PoffF | NoffF | Bearing | | | | |
| Value | 0 | 1 | 0 | 1 | 1 | 0 | 0 | 1 |

TABLE A54

Binary example: positive Offset

| Bit | 7 | 6 | 5 | 4 | 3 | 2 | 1 | 0 |
|---|---|---|---|---|---|---|---|---|
| Description | POFF | | | | | | | |
| Value | 0 | 0 | 0 | 0 | 0 | 0 | 1 | 0 |

The full binary data stream will have a length of 24 bytes and consists of the following (ordered as bytes from left to right and top to down):

```
00001010   00000100   01011011   01011011   00100011   01000110
11110100   00011010   01101100   00001001   00000000   10011011
11111110   00111011   00011011   10110100   00000100   11111111
11101011   11111111   10100011   00101011   01011001   00000010
1031110.1
```

The invention claimed is:

1. A method of resolving a location from an ordered list of location reference points being representative of nodes in an encoder digital map and each having attributes representative of a specific line or segment in said encoder digital map emanating from or incident at those nodes, comprising the steps of:
   (i) receiving an ordered list of location reference points being representative of nodes in an encoder digital map and each having attributes representative of a specific line or segment in said encoder digital map emanating from or incident at those nodes,
   (ii) for each location reference point, identifying at least one candidate node existing in a second digital map, and, using the available attributes of that location reference point, identifying at least one candidate line or segment existing in said second digital map emanating from or incident at said candidate node,
   (iii) performing a route search within said second digital map between:
      at least one of said at least one candidate node and the corresponding candidate line or segment emanating therefrom or incident thereat, and
      at least one of a candidate node for the next location reference point appearing in the list and the corresponding candidate line or segment emanating therefrom or incident thereat,
      and extracting from said second digital map each line or segment forming part of the route so determined between said candidate nodes,
   (iv) repeating step (iii) for each consecutive pair of location reference points up to and including the final location reference point appearing in the list.

2. A method according to claim 1 wherein the route search is a shortest path route search.

3. A method according to claim 1 wherein the route search operates on respective pairs of successive candidate nodes.

4. A method according to claim 1 wherein the route search includes a way of ensuring that the corresponding line or segment of the first of the pair of nodes forms part of the route resulting therefrom.

5. A method according to claim 1 wherein the candidate nodes identified are real nodes in that they are representative of real world intersections.

6. A method according to claim 1 wherein the extracting of each line or segment from the second digital map is enhanced by storing each of said extracted lines or segments in a location path list.

7. A method according to claim 6 wherein each location path list created for each successive route search is concatenated.

8. A method according to claim 6 wherein the lines or segments extracted during a succeeding route search are appended to a pre-existing location path list.

9. A method according to claim 1 further comprising rating said identified candidate nodes according to one or more prescribed metrics in the case where more than one candidate node is identified for a location reference point.

10. A method according to claim 9 wherein the rating is achieved using a rating function.

11. A method according to claim 10 wherein the rating function includes a candidate node rating part and a candidate line or segment rating part.

12. A method according to claim 11 wherein the candidate node rating part of the rating function includes some dependence on a representative or calculated distance between the location reference point or its absolute coordinates, and said candidate nodes or their absolute coordinates as appearing in and extracted from the second digital map.

13. A method according to claim 11 wherein the candidate line or segment rating part of the rating function includes a way of assessing the similarity of the line or segment attributes as appearing in the encoder digital map and those appearing in the second digital map used in resolving the location.

14. A method according to claim 1 wherein the method further comprises:
   determining, from the second digital map, a path length value for each path between successive candidate nodes within said second digital map, said path being established as a result of the route search between said successive candidate nodes,
   comparing the path length value so determined with a DNP attribute of the first of the two location reference points used in the route search, and
   in the event of too great a discrepancy between the path length value and the DNP attribute, either repeating the route search using at least one of alternative candidate nodes and lines for one or both of each successive pair of location reference points to attempt to reduce the discrepancy between path length value and DNP attribute, or reporting an error.

15. A method according to claim 1 further comprising applying any offset value which may be associated with the first and last location reference points to the first and last lines extracted from the second digital map as a result of the route search therein.

16. A non-transitory computer readable medium which stores a set of instructions which when executed performs a method of resolving a location from an ordered list of location reference points being representative of nodes in an encoder digital map and each having attributes representative of a specific line or segment in said encoder digital map emanating from or incident at those nodes, the method executed by the set of instructions comprising:
   (i) receiving an ordered list of location reference points being representative of nodes in an encoder digital map and each having attributes representative of a specific line or segment in said encoder digital map emanating from or incident at those nodes,
   (ii) for each location reference point, identifying at least one candidate node existing in a second digital map, and, using the available attributes of that location reference point, identifying at least one candidate line or segment existing in said second digital map emanating from or incident at said candidate node,
   (iii) performing a route search within said second digital map between:
      at least one of said at least one candidate node and the corresponding candidate line or segment emanating therefrom or incident thereat, and
      at least one of a candidate node for the next location reference point appearing in the list and the corresponding candidate line or segment emanating therefrom or incident thereat,
   and extracting from said second digital map each line or segment forming part of the route so determined between said candidate nodes,
   (iv) repeating step (iii) for each consecutive pair of location reference points up to and including the final location reference point appearing in the list.

17. A computing device comprising:
   a processor;
   a memory storage;
   a program resource being a digital map, stored in the memory storage or in a different storage; and
   an information output device,
   wherein the processing unit is operative to:
      (i) receive an ordered list of location reference points being representative of nodes in an encoder digital map and each having attributes representative of a specific line or segment in said encoder digital map emanating from or incident at those nodes,
      (ii) for each location reference point, identify at least one candidate node existing in a second digital map, and, using the available attributes of that location reference point, identify at least one candidate line or segment existing in said second digital map emanating from or incident at said candidate node,
      (iii) perform a route search within said second digital map between:
         at least one of said at least one candidate node and the corresponding candidate line or segment emanating therefrom or incident thereat, and
         at least one of a candidate node for the next location reference point appearing in the list and the corresponding candidate line or segment emanating therefrom or incident thereat,
      and extracting from said second digital map each line or segment forming part of the route so determined between said candidate nodes,
      (iv) repeat step (iii) for each consecutive pair of location reference points up to and including the final location reference point appearing in the list.

18. A computing device according to claim 17 wherein the information output device provides at least one of an audible output, a printed output, or a visible output on a display screen capable of displaying a graphical representation of said digital map.

19. A computing device according to claim 18 wherein a resolved location or a portion of it is displayed in superposed, overlaid, juxtaposed or in conjunction with the relevant portion of the digital map to which it relates.

20. A method according to claim 1 further comprising rating candidate lines or segments to identify a most likely candidate line or segment according to one or more prescribed metrics in the case where more than one candidate line or segment existing in the second digital map is identified.

21. A method according to claim 20 further comprising using a bearing attribute for the rating of candidate lines or segments.

22. A method according to claim 2 further comprising validating each shortest path using a determined path value between a start node and end node.

23. A method according to claim 1 further comprising converting the ordered list of location reference points into a binary location reference.

* * * * *